United States Patent [19]

Ito

[11] Patent Number: 4,985,759
[45] Date of Patent: Jan. 15, 1991

[54] METHOD AND APPARATUS FOR EXTRACTING BLACK COLOR COMPONENT

[75] Inventor: Takanori Ito, Yokohama, Japan

[73] Assignee: Ricoh Company, Ltd., Tokyo, Japan

[21] Appl. No.: 333,026

[22] Filed: Apr. 4, 1989

[30] Foreign Application Priority Data

Apr. 5, 1988 [JP] Japan .................................. 63-83733
Apr. 21, 1988 [JP] Japan .................................. 63-99171

[51] Int. Cl.$^5$ .............................................. H04N 1/46
[52] U.S. Cl. ........................................ 358/79; 358/75
[58] Field of Search ...................... 358/75, 79, 80, 22, 358/28

[56] References Cited

U.S. PATENT DOCUMENTS

| | | | |
|---|---|---|---|
| 4,535,413 | 8/1985 | Shiota et al. | 358/80 |
| 4,597,006 | 6/1986 | Orsburn | 358/80 |
| 4,642,681 | 2/1987 | Ikeda | 358/79 |
| 4,656,505 | 4/1987 | Yamada et al. | 358/80 |
| 4,682,216 | 7/1987 | Sasaki et al. | 358/80 |
| 4,694,329 | 9/1987 | Belmares-Sarabia et al. | 358/80 |
| 4,796,086 | 1/1989 | Ohta et al. | 358/80 |
| 4,893,179 | 1/1990 | Ito | 358/79 |

FOREIGN PATENT DOCUMENTS

| | | |
|---|---|---|
| 2208460 | 3/1989 | Japan . |
| 1-228268 | 9/1989 | Japan . |
| 1-255380 | 10/1989 | Japan . |
| 1-272266 | 10/1989 | Japan . |
| 1-277062 | 11/1989 | Japan . |

*Primary Examiner*—James J. Groody
*Assistant Examiner*—Kim Yen Vu
*Attorney, Agent, or Firm*—Oblon, Spivak, McClelland, Maier & Neustadt

[57] ABSTRACT

A black color component extracting apparatus used for a color image reproducing machine. The apparatus includes a hue area judgement unit for judging to which hue area among at least three predetermined hue areas the hue represented by input color image signals belongs. With respect to the judged hue area according to this judgement, the black color extraction parameters are set, and in accordance with the set black color extraction parameters, black color component is extracted. The black color extraction parameters are determined from two chromatic colors P and Q positioned in respective boundary planes which defines the judge hue area, and from an achromatic color N.

29 Claims, 19 Drawing Sheets

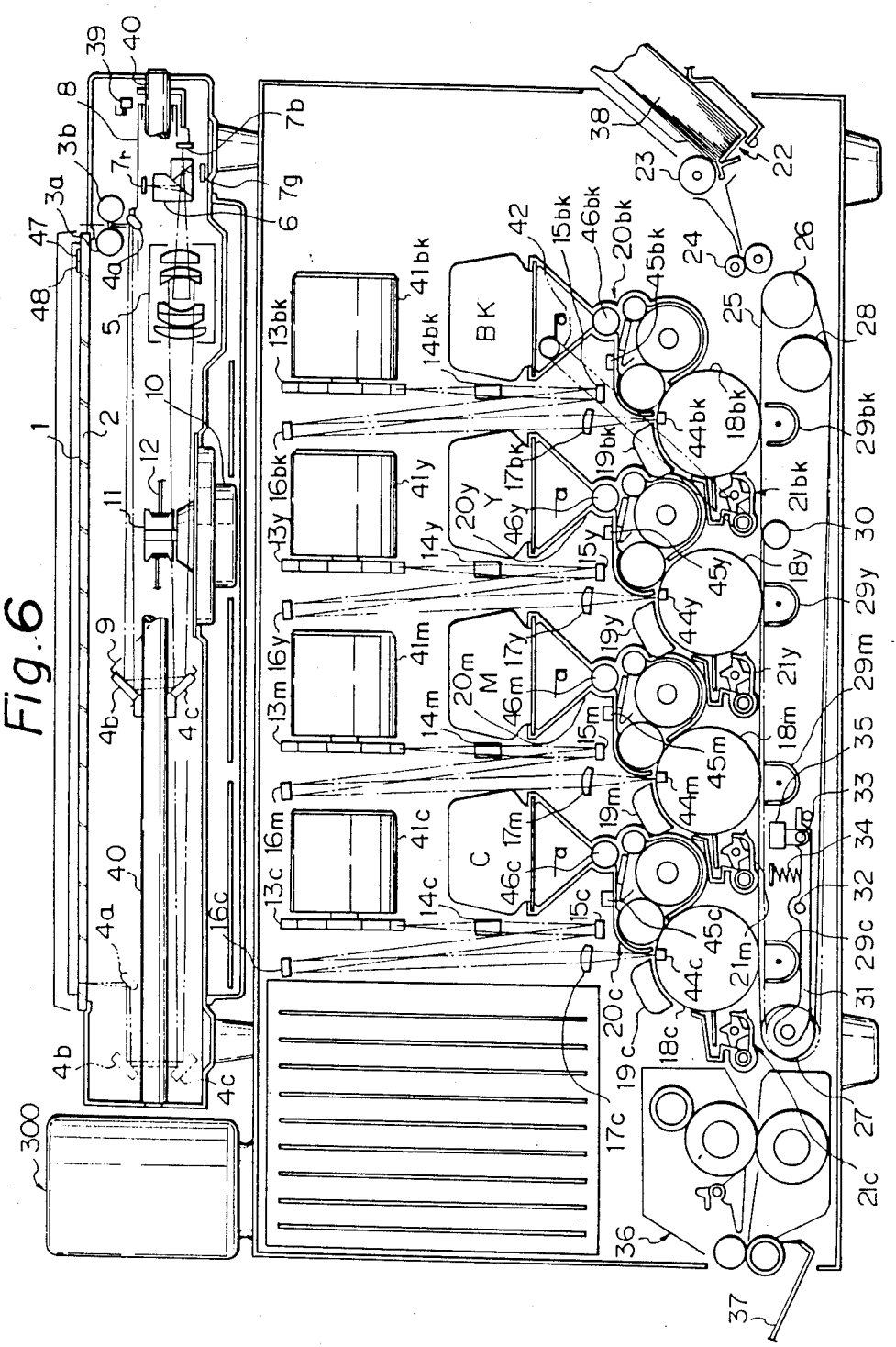

METHOD AND APPARATUS FOR EXTRACTING BLACK COLOR COMPONENT

BACKGROUND OF THE INVENTION

1. Field of the Invention

The present invention relates to a method and apparatus for extracting the recording density data of a black color component from a plurality of image data representing, respectively, color component densities for plurality of colors obtained by reading a color image.

2. Description of the Related Art

In digital color image reproducing machines, for example, color copying machines, color facsimile units, color video printers, etc. a color.image is converted by opto-electronic conversion devices into R (red) component density signals, G (green) component density signals and B (blue) component density signals. Such converted signals are digitally converted into image data Dr, Dg and Db for each of the color components. These image data Dr, Dg and Db are converted into recording density data Dy, Dm and Dc for respective recording colors (Y: yellow, M: magenta and C: cyan), respectively and the recording densities for the respective color toners are determined, respectively, based on the recording density data Dy, Dm and Dc.

Theoretically, all the colors can becompletely reproduced by the combination of these data for respective colors C, M and Y. For instance, an achromatic color such as black or grey can be reproduced by synthesizing C, M and Y each at an identical density. However, in the actual case, since the spectral density of each of the toners for recording each of the colors C, M and Y is deviated from the ideal characteristic and since there is a deviation between the theoretical characteristic and the actual characteristic of a color obtained by the synthesis of C, M and Y, it often fails to obtain a desired color only by the use of C, M and Y. For instance, if recording is conducted by synthesizing C, M and Y each by an identical amount for obtaining grey color, chromatic color components are frequently contained in the recorded color.

In view of the above, images have been reproduced in most of recent digital color copying machines with four fundamental colors by adding BK (black) to C, M and Y. In such machine, an achromatic color component is extracted from input image signals, the signals are applied to a black color recording system and the balance after subtracting the achromatic color component from the input image signals is applied to the recording systems for C, M and Y.

Extraction of the achromatic color component, that is, extraction of black color component is performed by extracting the recording density data Dbk of the black color component from image data Dr, Dg and Db. The applicant of this application has proposed in U.S. Pat. Application Ser. No. 260,277 (filed on Dec. 20, 1988), a method and apparatus for extracting the black color component by judging to which hue area among predetermined three hue areas the hue represented by the image data Dr, Dg and Db belong to, setting parameters of an achromatic color (black color component) in accordance with the thus judged hue area, and obtaining recording density data Dbk showing the black toner recording density from the image data Dr, Dg and Db in accordance with the achromatic color extraction parameters thus set.

In this method for extracting the black color component, since the full black BK toner recording density data are obtained, boundaries of at least the following three hue areas have to be disposed.

Hue area recorded by two, i.e., C and BK toners, hue area recorded by two, i.e., M and BK toners, and hue area recorded by two, i.e., Y and BK toners.

Thus, there is a problem that a portion for the boundary of the hue areas can not optionally be selected. In view of the above, upon judging the hue area, since it is necessary to form hue signals from the image data Dr, Dg and Db and compare them with signals representing the boundary for the hue areas to thereby judge the hue area, a complicated processing circuit is required for the judgement of the hue area and it is difficult to obtain the apparatus at a reduced cost.

In addition, an optimum result can not always be obtained by recording all of the achromatic color components in the input images by the black toner, but it is sometime preferred to combine with an achromatic color by the synthetic recording of C, M and Y. In view of the above, there has been proposed a method of adjusting the ratio between the achromatic color by the synthetic recording for C, M and Y and the achromatic color of the black toner to a predetermined value by means of a translation table using a ROM.

However, the optimum value for the ratio varies depending on the saturation of the images. It is preferred, for example, to make the ratio for the black toner lower if the color of the image has high saturation, while to make the ratio for the black toner higher if it is near an achromatic color. Therefore, satisfactory extraction for the black color component can not always be conducted for the images of all of saturations by the method of adjusting the ratio to a constant value as described above.

SUMMARY OF THE INVENTION

It is, therefore, an object of the present invention to provide a method and apparatus for extracting the black color component capable of optionally selecting the boundaries for all of hue areas.

Another object of the present invention is to provide a method and apparatus for extracting the black color component, which can easily judge the hue area and can simplify the constitution of the circuit therefor.

A further object of the present invention is to provide a method and apparatus for extracting the black color component capable of continuously maintaining the recording density of black toner relative to the image data Dr, Dg and Db.

A still further object of the present invention is to provide a method and apparatus for extracting the black color component capable of setting the ratio between the achromatic color obtained by the synthesis of C, M and Y and the black color toners to an optimum value with respect to all of the input images.

In order to achieve the above objects, the present invention provides a black color component extraction apparatus which extracts a black color component from input image signals of basic colors, representative of color-separated input images. The apparatus comprises a hue area judgement unit for judging to which hue area among at least three predetermined hue areas the hue represented by the input image signals belongs, a parameter setting unit for setting black color extraction parameters with respect to the judged hue area, the black color extraction parameters being determined from two chromatic colors P and Q positioned in respective boundary planes which define the judged hue area and from an achromatic color N, and an extraction unit for extracting the black color component contained in the input images in accordance with the set black color extraction parameters to produce a black color component signal representative of the extracted black color component.

The present invention also provides a black color component extraction apparatus which extracts a black color component from input image signals of basic colors, representative of color.separated input images. The apparatus comprises a designation unit for designating a desired saturation, a hue area judgement unit for judging to which hue area among at least three predetermined hue areas the hue represented by the input image signals belongs, a parameter setting unit for setting black color extraction parameters with respect to the judged hue area, the black color extraction parameters being determined from two chromatic colors P and Q positioned in respective boundary planes which define the judged hue area and from an achromatic color N, the ratio between a color component synthesized from the chromatic colors and the black color component being controlled depending upon the designated saturation from the designation unit, and an extraction unit for extracting the black color component contained in the input images in accordance with the set black color extraction parameters to produce a black color component signal representative of the extracted black color component.

Preferably, the hue area judgement unit comprises a comparison unit for comparing the input image signals with each other. The comparison unit may include three comparators for comparing the three input image signals with each other.

It is preferred that the hue area judgement unit further comprises an adding unit for adding two of the three input image signals, and a comparison unit for comparing the remaining one of the three input image signals with the added result. The adding unit may include an adder for adding two of the three input image signals to produce an output signal, and the comparison unit may include a comparator for comparing the remaining one of the three input image signals with the output signal from the adder.

It is desired that the parameter setting unit comprises a storing unit for storing black color extraction parameters and a selection means for selecting a part of the black color extraction parameters stored in the storing unit in accordance with the hue area judged.

The extraction unit may include a plurality of multipliers, with each multiplier receiving one of the input image signals and each unit also receiving a black color extraction parameter from the parameter setting unit, for producing a product signal, and at least one adder for adding together the product signals to produce an output signal.

The present invention further provides a color image reproducing machine which comprises a reading process unit for optoelectrically converting light signals separated in basic colors, representative of color.-separated images of an original document, to electrical input image signals, respectively, a hue area judgement unit for judging to which hue area among at least three predetermined hue areas the hue represented by the input image signals belongs, a parameter setting unit for setting black color extraction parameters with respect to the judged hue area, the black color extraction parameters being determined from two chromatic colors P and Q positioned in respective boundary planes which define the judged hue area and from an achromatic color N, an extraction unit for extracting the black color component contained in the input images in accordance with the set black color extraction parameters to produce a black color component signal representative of the extracted black color component, a correction unit for correcting the input image signals in accordance with the black color component signal, a color conversion unit for converting the corrected input image signals to output image signals, and an image printing unit for printing a color image of the original in accordance with the converted output image signals.

Other objects and features of the present invention will now be apparent from the following description on embodiments of the present invention in conjunction with the drawings.

BRIEF DESCRIPTION OF THE DRAWINGS

FIG. 6 is a front view of a mechanical section of a digital color copying machine as one embodiment of the present invention;

DETAILED DESCRIPTION OF THE PREFERRED EMBODIMENTS

The principle of the present invention is at first explained before proceeding to the explanation for preferred embodiments.

In the present invention, the recording density (Dbk) of the black toner used for recording an optional color in a hue area is determined from the spectral density of chromatic colors P and Q which are situated on both of the boundaries of the hue area and are capable of recording by the combination of cyan, magenta and yellow toners each by a predetermined amount (Dr≠Dg or Db≠Db or Dg≠Dr), and of an achromatic color N capable of recording only with the black toner (Dr=Dg=Db). As a result, the boundary of the hue areas can optionally be selected by determining the hue of the chromatic colors P and Q to a desired hue.

The following is a more detailed explanation regarding this point.

Figure 1:
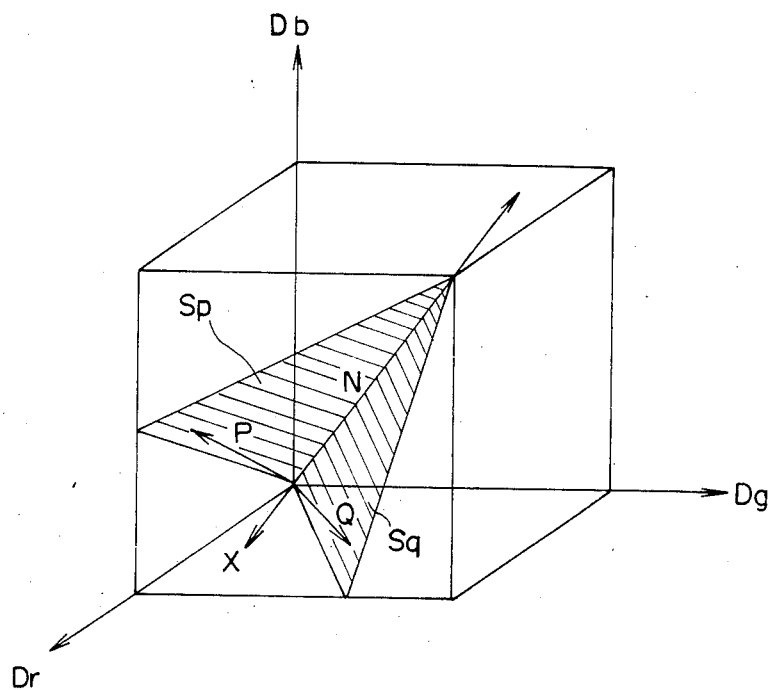
FIG. 1 is a graph illustrating a color space represented by three axes of Dr, Dg and Db.

FIG. 1 is a view showing an example of hue areas when a color space (Dr, Dg and Db) is divided by means of hues. Referring to FIG. 1, the color space (Dr, Dg, Db) is partitioned by a plane Sp passing through the achromatic color axis (Dr=Dg=Db) and a chromatic color P and a plane Sq passing through an achromatic color axis and a chromatic color Q. The color space surrounded with the planes Sp and Sq is hereinafter assumed as a single hue area. The width of the hue area, that is, the angle made between the planes Sp and Sq with the achromatic color axis as the center is assumed to be less than 180°. In addition, in the present invention, processing is conducted while the additivity rule and proportion rule for the density are established within this hue area.

It is assumed in the present invention that if the spectral densities (DXr, DXg, DXb) for a certain color X in the hue area can be represented as a synthesized vector for the spectral densities of the achromatic color N (DNr, DNg, DNb), and chromatic colors P and Q (DPr, DPg, DPb) and (DQr, DQg, DQb) as shown in equation (1), the recording densities of the cyan, magenta, yellow and black toners required for recording the color X (DXc, DXm, DXy, DXbk) can be represented by a synthesized vector of the recording densities required for recording the achromatic color N (DNc, DNm, DNy, DNbk), and chromatic colors P and Q (DPc, DPm, DPy, DPbk) and (DQc, DQm, DQy, DQbk). In equation (2), DNc=DNm=DNy=0 since the achromatic color N is recorded only by the black toner, while DPbk=DQbk=0 since the chromatic colors P and Q are recorded by the combination of cyan, magenta and yellow toners each by a predetermined amount. In equations (1) and (2), n, p and g are unknowns.

$$\begin{bmatrix} DXr \\ DXg \\ DXb \end{bmatrix} = \begin{bmatrix} DNr \\ DNg \\ DNb \end{bmatrix} \cdot n + \begin{bmatrix} DPr \\ DPg \\ DPb \end{bmatrix} \cdot p + \begin{bmatrix} DQr \\ DQg \\ DQb \end{bmatrix} \cdot q \quad (1)$$

$$\begin{bmatrix} DXc \\ DXm \\ DXy \\ DXbk \end{bmatrix} = \begin{bmatrix} DNc \\ DNm \\ DNy \\ DNbk \end{bmatrix} \cdot n + \begin{bmatrix} DPc \\ DPm \\ DPy \\ DPbk \end{bmatrix} \cdot p + \begin{bmatrix} DQc \\ DQm \\ DQy \\ DQbk \end{bmatrix} \cdot q \quad (2)$$

Accordingly, if the spectral densities for the optional color X, achromatic color N and chromatic colors P and Q are known in equation (1), equation (1) can be considered as three linear simultaneous equation having unknowns n, p and q. That is, n, p and q can be determined by the following equation (3):

$$\begin{bmatrix} n \\ p \\ q \end{bmatrix} = \begin{bmatrix} DNr & DPr & DQr \\ DNg & DPg & DQg \\ DNb & DPb & DQb \end{bmatrix}^{-1} \times \begin{bmatrix} DXr \\ DXg \\ DXb \end{bmatrix} \quad (3)$$

$$= \begin{bmatrix} KNr & KNg & KNb \\ KPr & KPg & KPb \\ KQr & KQg & KQb \end{bmatrix} \times \begin{bmatrix} DXr \\ DXg \\ DXb \end{bmatrix}$$

where each of KNr, KNg, KNb, KPr, KPg, KPb, KQr, KQg and KQb represents a constant.

It is apparent here that if n, p and q can be determined by equation (3), the recording densities for the cyan, magenta, yellow and black toners required for recording the optional color X can be determined by equation (2).

The relationship between the recording density DXbk of the black toner required for recording the optional color X and the spectral density of the optional color X is as shown by the following equation (4):

$$DXbk = DNbk \cdot (KNr \cdot DXr + KNg \cdot DXg + KNb \cdot DXb) \quad (4)$$
$$= KNr' \cdot DXr + KNg' \cdot DXg + KNb' \cdot DXb$$

where KNr'=DNbk·KNr, KNg'=DNbk·KNg, KNb'=DNbk·KNb.

Accordingly, in the hue area surrounded with the plane Sp passing through the achromatic color axis and the chromatic color P and the plane Sq passing through the achromatic color axis and the chromatic color Q, the recording density of the black toner can be determined according to the equation (4), and the constants KNr', KNg' and KNb' in the equation (4) can be determined by the spectral densities of the achromatic color N and the chromatic colors P and Q, and by the recording density required for recording the achromatic color N.

Since this means that the recording density of the black toner can be determined even by selecting the spectral densities optionally for the chromatic colors P and Q and, accordingly, the hues for the chromatic colors P and Q, it is apparent that the boundary of the hue area can freely be selected in accordance with the present invention. As has been described above, the width for the hue area is restricted to less than 180°.

Further, in the present invention, also in the adjacent hue areas, the recording density for the black toner Dbk can be determined in continuous with respect to the image data Dr, Dg, Db by using the chromatic color (P or Q) on the above.mentioned boundary and the achromatic color (N).

Figure 2A:
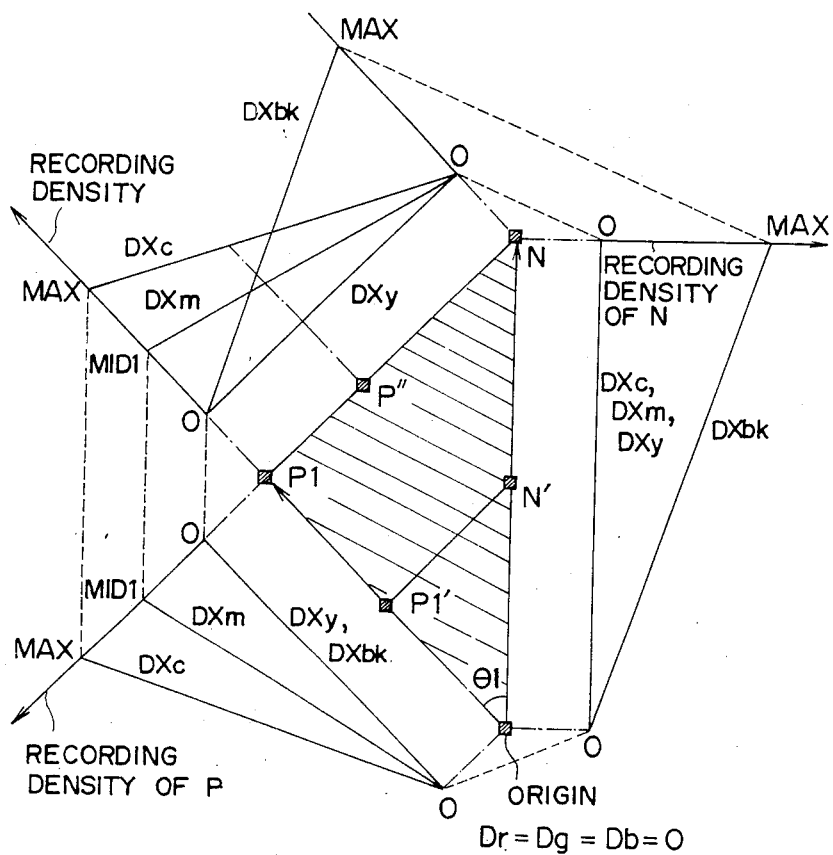
FIGS. 2a, 2b, 3a, 3b, 3c and FIG. 4 are graphs, respectively, showing the change of the recording density for each of the color toners in a case where the optional color X is changed in each of predetermined color planes.
Figure 2B:
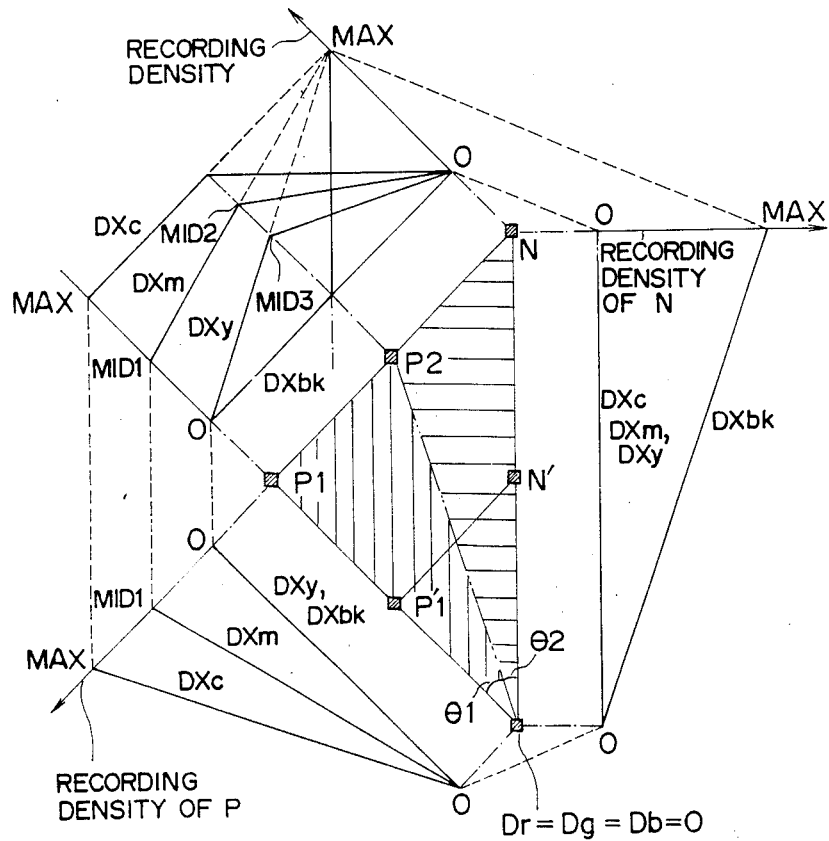

FIGS. 2a and 2b show the change of the recording density for each of the toners in the boundary plane Sp of the hue area in FIG. 1. Another feature of the present invention is to be explained below referring to FIGS. 2a and 2b. For ease of explanation, it is assumed here that the maximum density value capable of recording with cyan, magenta, yellow and black toners are identical with each other at MAX and a color having the spectral density (DNr, DNg, DNb) at MAX is selected as the achromatic color N. Accordingly, the recording density DNbk of the black toner required for recording the achromatic toner N is MAX, while the recording densities DNc, DNm and DNy for the cyan, magenta and yellow toners are respectively "0".

FIG. 2a shows a case in which the highest saturation color is selected for the chromatic color P1 on the boundary plane Sp. The highest saturation color means such a color in which the recording densities of cyan, magenta, yellow and black toners (Dc, Dm, Dy, Dbk) required for recording the color has a relationship: "Dc, Dm, Dy are positive or is "0", one or two of Dc, Dm and Dy is "0" and Dbk is "0". Further, among the colors capable of recording in the plane passing through the achromatic color axis and the high saturation color (colors for which the recording density of the black toner is "0", and the recording densities for the cyan, magenta and yellow toners neither go negative nor exceed the maximum density value capable of recording in view of the calculation), the maximum angle $\theta 1$ made between the vector representing the color and the vector representing the achromatic color N is at the maximum for the highest saturation color. For ease of explanation, FIG. 2a shows a case where the recording density DPc1 of the cyan toner takes MAX, the recording density DPm1 for the magenta toner takes an intermediate value (MID1) between MAX and "0" and the recording density for yellow toner DPy1 takes "0" with the chromatic color P1.

In such a boundary plane Sp, the spectral density for the optional color X (DXr, DXg, DXb) on the boundary plane Sp can be represented as a synthesized vector for the spectral densities of the achromatic color N (DNr, DNg, DNb), and the chromatic color P1 (DPr1, DPg1, DPb1) and the recording density for the color X (DXc, DXm, DXy, DXbk) can be represented as a synthesized vector for the achromatic color N (DNc, DNm, DNy, DNbk), and the chromatic color P1 (DPc1, DPm1, DPy1, DPbk1).

$$\begin{bmatrix} DXr \\ DXg \\ DXb \end{bmatrix} = \begin{bmatrix} DNr \\ DNg \\ DNb \end{bmatrix} \cdot n1 + \begin{bmatrix} DPr1 \\ DPg1 \\ DPb1 \end{bmatrix} \cdot p1 \quad (5)$$

where $DNr = DNg = DNb = MAX$ $$\begin{bmatrix} DXc \\ DXm \\ DXy \\ DXbk \end{bmatrix} = \begin{bmatrix} DNc \\ DNm \\ DNy \\ DNbk \end{bmatrix} \cdot n1 + \begin{bmatrix} DPc1 \\ DPm1 \\ DPy1 \\ DPbk1 \end{bmatrix} \cdot p1 \quad (6)$$

where $DNbk = DPc1 = MAX$, $DNc = DNm = DNy = DPbk1 = DPy1 = 0$, $DPm1 = MID1$.

Accordingly, as shown in FIG. 2a, assuming that the color X moves linearly on the boundary plane Sp from P1 to N, the recording density DXbk of the black toner required for recording the color X changes from "0" to MAX in proportion with the moving amount. On the other hand, assuming a case of applying a processing of reducing the density recorded by the toner by 100% from the density recorded by the cyan, magenta and yellow toners (100% UCR processing), the recording densities DXc and DXm of the cyan and magenta toners required for recording the color X change, respectively, from MAX and MID1 to "0" in proportion with the moving amount, while the recording density DXy of the yellow toner remains unchanged at "0" and is not recorded. That is, by selecting the highest saturation color for the chromatic color P1, the recording density of the black toner corresponding to that of full black required for recording the color X on the boundary plane Sp can be determined.

On the other hand, FIG. 2b shows a case in which an intermediate color on the same boundary plane as the chromatic color P1 shown in FIG. 2a is selected as the chromatic color P2. The term of an intermediate color in this specification is defined as a color for which the recording densities of the cyan, magenta, yellow and black toners (Dc, Dm, Dy, Dbk) required for recording this intermediate color have a relationship that "all of Dc, Dm and Dy are positive and Dbk is "0". In addition, angle $\theta 2$ made between a vector representing the highest saturation color and a vector representing the achromatic color N on the plane passing through the achromatic color axis and the intermediate color is smaller than the angle $\theta 1$. For easier explanation, the chromatic color P2 shown in FIG. 2b is explained in such a case that the recording density of the cyan toner DPc2 takes MAX, the magenta recording density DPm2 takes an intermediate value (MID2) between MAX and "0" and the yellow recording density DPm2 takes a value (MID3) between MAX and "0".

In the same manner as in FIG. 2a, also in the boundary plane Sp, the spectral densities for the optional color X (DXr, DXg, DXb) on the boundary place Sp can be represented as a synthesized vector of the achromatic color N (DNr, DNg, DNb), and the chromatic color P2 (DPr2, DPg2, DPb2) and the recording densities for the color X (DXc, DXm, DXy, DXbk) can be represented as the synthesized vector for the recording densities of the achromatic color N (DNc, DNm, DNy, DNbk), and the chromatic color P2 (DPc1, DPm2, DPy2, DPbk2).

$$\begin{bmatrix} DXr \\ DXg \\ DXb \end{bmatrix} = \begin{bmatrix} DNr \\ DNg \\ DNb \end{bmatrix} \cdot n2 + \begin{bmatrix} DPr2 \\ DPg2 \\ DPb2 \end{bmatrix} \cdot p2 \quad (7)$$

where $DNr = DNg = DNb = MAX$ $$\begin{bmatrix} DXc \\ DXm \\ DXy \\ DXbk \end{bmatrix} = \begin{bmatrix} DNc \\ DNm \\ DNy \\ DNbk \end{bmatrix} \cdot n2 + \begin{bmatrix} DPc2 \\ DPm2 \\ DPy2 \\ DPbk2 \end{bmatrix} \cdot p2 \quad (8)$$

where $DNbK = DPc1 = MAX$, $DNc = DNm = DKy = Dbk2 = 0$, $DPm2 = MID2$, $DPy2 = MID3$.

Accordingly, as shown in FIG. 2b, assuming that the color X moves linearly on the boundary plane Sp from P2 to N, the recording density DXbk for the black toner required for recording the color X changes from "0" to MAX in proportion with the moving amount. On the other hand, assuming 100% UCR processing is conducted, the recording densities DXc, DXm and DXy of the cyan, magenta and yellow toners required for recording the color X change, respectively, from MAX, MID2 and MID3 to "0" in proportion with the moving amount. In addition, assuming that the color X moves linearly on the boundary plane Sp from P1 to P2, the recording density DXbk of the black toner required for recording the color X is theoretically negative and, since the processing can be done finally regarding it as "0", the black toner is not recorded. On the other hand, since the recording density DXbk of the black toner is substantially "0", the recording densities DXc, DXm and DXy of the cyan, magenta and yellow toners required for recording the color X change from "0" to MAX, MID2 and MID3, respectively, in proportion with the moving amount.

Now comparing FIG. 2a with FIG. 2b, the ratio between recording density of black toner in FIG. 2b and recording density of black toner in FIG. 2a changes from "1" to "0" between N and P2, while it is substantially "0" between P2 and P1. It is further apparent that the relationship can be established not only between the chromatic color P1 and the achromatic N but also between the colors at intermediate densities (for instance, colors between P1' and N'). Accordingly, such a processing can be done that recording density of the black toner nearly to that of full black can be obtained for the color near the achromatic color axis, while recording density of the black toner more remote from that of the full black can be obtained as the saturation goes higher by selecting an intermediate color for the chromatic color P.

Although explanation has been made for the recording density of the black toner on the boundary plane Sp, similar processing can also be made within the hue area as shown in FIG. 1.

Figure 3A:
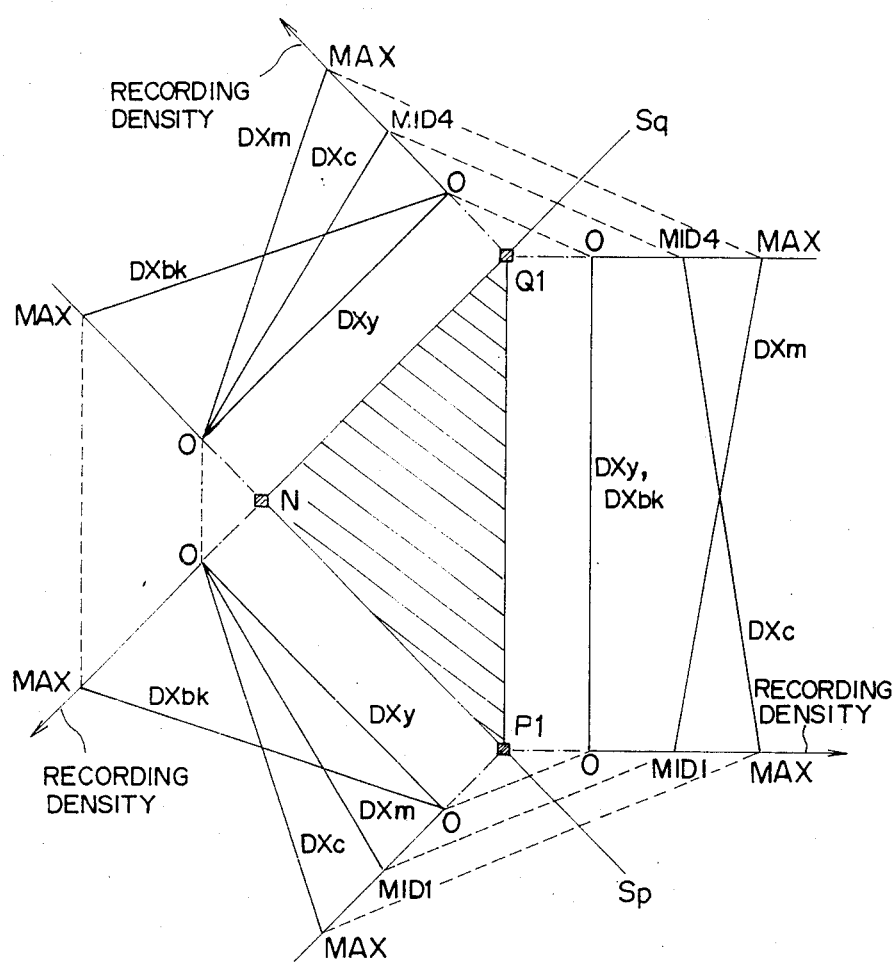
Figure 3B:
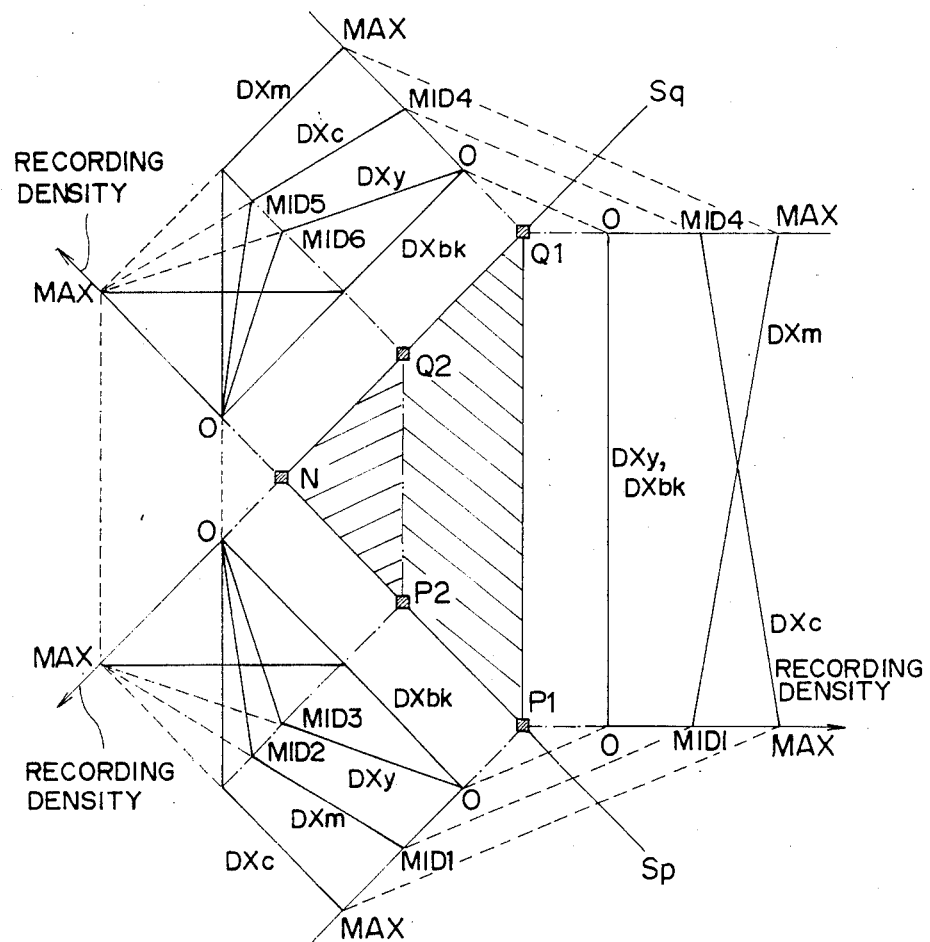
Figure 3C:
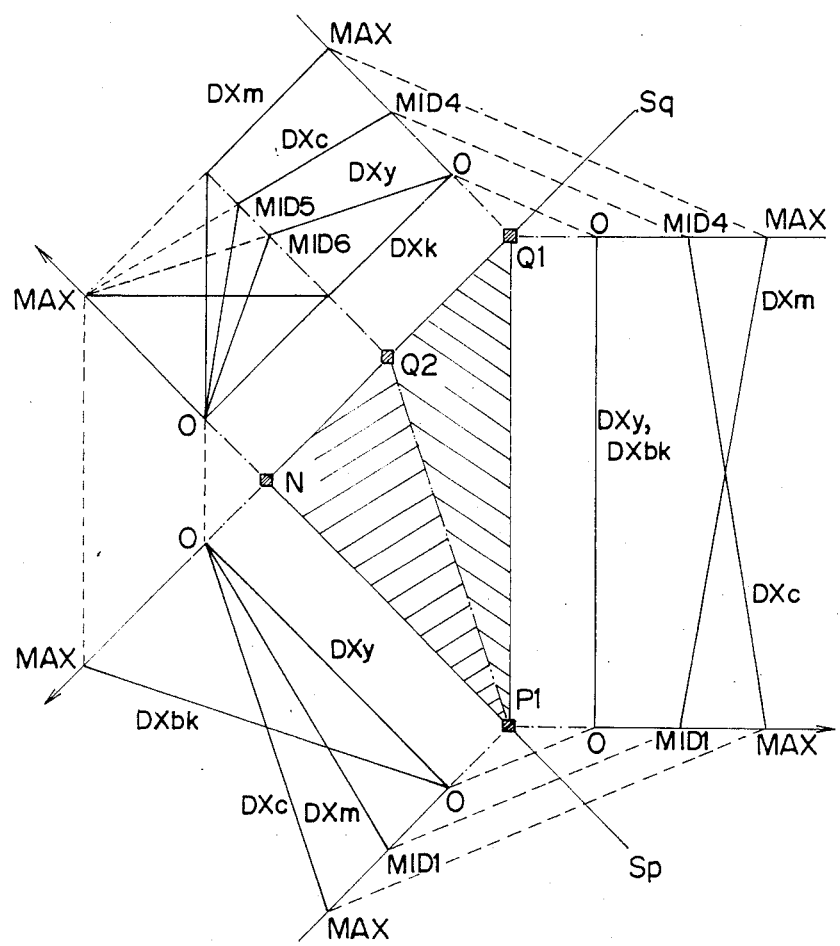

FIGS. 3a, 3b and 3c show the change of recording density for each of the toners in a plane passing through the achromatic color N and the chromatic colors P and Q. The recording density for the black toner in the hue area is to be described referring FIGS. 3a, 3b and 3c. For the ease of explanation, it is assumed also in FIGS. 3a, 3b and 3c in the same manner as in FIGS. 2a and 2b that the maximum density values capable of recording for cyan, magenta, yellow and black toners are identical with each other and at MAX and the spectral density of the achromatic color N is at MAX.

FIG. 3a shows a case in which the highest saturation color is selected for each of the chromatic colors P1 and Q1. For easier explanation, it is assumed in FIGS. 3a, 3b and 3c, that the chromatic color P1 is identical with that in FIGS. 2a and 2b, the chromatic color Q1 is such that the recoridng density DQc1 of the cyan toner is at an intermediate value (MID4) between MAX and "0", the recording density DQm1 for the magenta toner is at MAX and the recording density DQy1 of the yellow toner is "0".

Assuming that the color X moves linearly on the plane from P1 to N in FIG. 3a, the recording density DXbk of the black toner required for recording the color X changes from "0" to MAX in proportion with the moving amount. In the same manner, if the color X moves linearly on the plane from Q1 to N, the recording density DXbk of the black toner required for recording the color X also changes from "0" to MAX in proportion with the moving amount. On the other hand, if the color X moves linearly on the plane from P1 to Q1, the recording density DXbk of the black toner remains "0" and is not recorded. Accordingly, recording hue area, the recording density DXy of the yellow toner remains "0" and is not recorded. Accordingly, recording density of the black toner corresponding to that of full black is determined in this case.

FIG. 3b shows a case in which intermediate colors on the same boundary plane as the chromatic colors P1 and Q1 in FIG. 3a are selected for the chromatic colors P2 and Q2. Further, for easier explanation, the chromatic color P2 shown in FIGS. 3a, 3b and 3c is identical with the color in FIGS. 2a and 2b and the chromatic color Q2 shows such a case in which the recording density DQc2 of the cyan toner takes an intermediate value (MID5) between MAX and "0", the recording density DQm2 of the magenta toner is at MAX and the recording density DQy2 of the yellow toner takes an intermediate value (MID6) between MAX and "0".

Assuming in FIG. 3b that the color X moves linearly on the plane from P2 to N, the recording density DXbk of the black toner required for recording the color X changes from "0" to MAX. In the same way, in a case if the color X moves linearly on the plane from Q2 to N, it also changes from "0" to MAX in proportion with the moving amount. On the other hand, assuming that the color X removes linearly on the plane from P1 to P2, the recording density DXbk of the black toner required for the recording color X is theoretically negative and, since the processing can be conducted finally regarding it as "0", the black toner is not recorded. In the same way, also in a case if the color X moves linearly on the plane from Q1 to Q2, the black toner is not recorded. Also in a case if the color X moves linearly on the plane from P2 to Q2, the recording density DXbk of the black toner remains "0" and is not recorded.

Comparing FIG. 3a with FIG. 3b, the ratio between recording density of black toner in FIG. 3b and recording density of black toner in FIG. 3a approaches "1" as the color goes nearer to "1" and the ratio is subtantially "0" for those colors between chromatic colors P1 and P2 and between Q1 and Q2. It is apparent that the relationship can be established not only between the chromatic colors P1 and Q1 and the achromatic color N but also for those colors in intermediate hues. Accordingly, it is possible to conduct such a processing that recording density of the black toner nearly to full black is obtained for the colors near the achromatic axis, whereas recording density of the black toner away from full color can be obtained for the black away from the achromatic color axis, that is, as the saturation goes higher FIG. 3c shows a case in which the highest saturation color is selected for the chromatic color P1 and an intermediate color is selected for the chromatic color Q2. In FIG. 3c, assuming that the color X moves linearly on the plane from P1 to N, the recording density DXbk of the black toner required for recording the color X changes from "0" to MAX in proportion with the moving amount In the same manner, if the color X moves linearly on the plane from Q2 to N, it also changes from "0" to MAX in proportion with the moving amount. On the other hand, assuming that the color X moves linearly on the plane from Q1 to Q2, the recording density DXbk of the black toner required for recording the color X is theoretically negative and, since the processing can be conducted while finally regarding it as "0", the black toner is not recorded On the other hand, if the color X moves linearly on the plane from P1 to Q2, the recording density DXbk ofthe black toner remains "0" and is not recorded.

Comparing FIGS. 3a, 3b and 3c to each other, it is apparent that the ratio between recording density of black toner in FIG. 3c and recording density of black toner in FIG. 3a approaches "1" as the color goes nearer to the hue Sp and the ratio between recording density of black toner in FIG. 3c and recording density of black toner in FIG. 3b approaches "1" as the color goes nearer to the hue Sq.

Therefore, according to the present invention, it is possible to conduct such processing that the recording density of the black toner corresponding to that of full black is obtained, the recording density of the black toner nearly to that of full black is obtained for those colors near the achromatic axis, or the recording density of black toner more remote from the full black is obtained as the color is away from the achromatic axis, depending on the hue.

Figure 4:
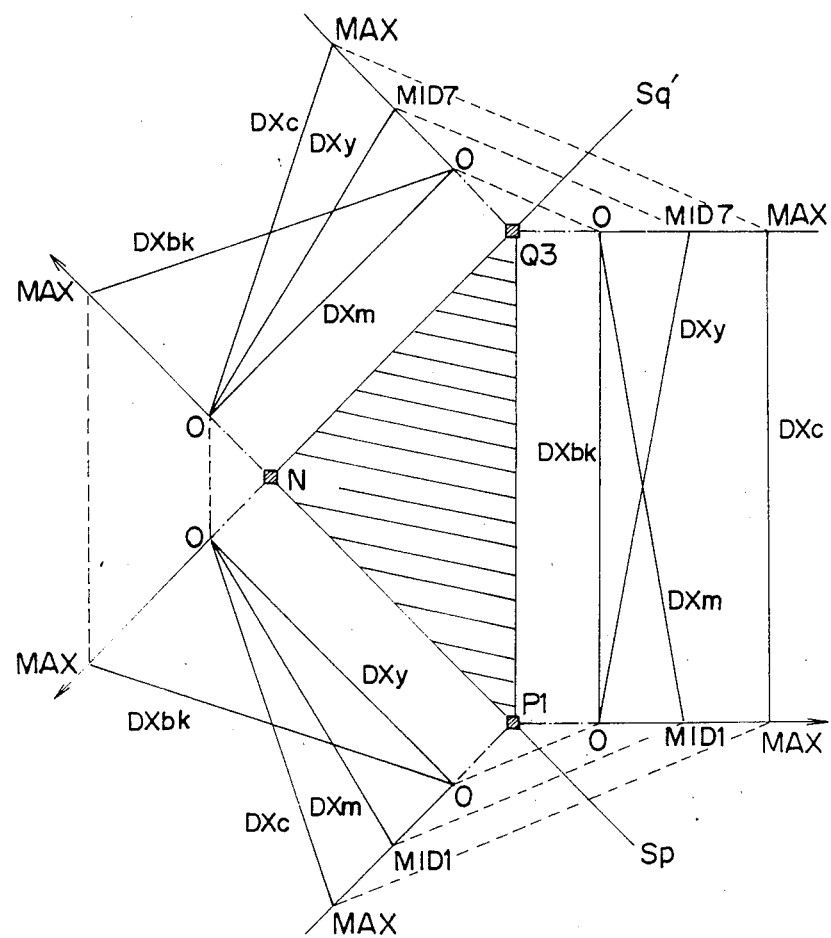

FIG. 4 also shows the change for the recording density of each of the toners in the plane passing through the achromatic color N and chromatic colors P and Q. For easier explanation, it is also assumed in FIG. 4 in the same way as in FIGS. 2a and 2b that the maximum density values capable of recording of the cyan, magenta, yellow and black toners are identical with each other at MAX and the spectral density of the achromatic color N is at MAX. Further, for easier explanation, FIG. 4 shows such a case in which the highest saturation color is selected for each of the chromatic colors P1 and Q3, the same color as that in FIGS. 2a and 2b is selected for the chromatic color P1, and the chromatic color Q3 is shown as such a case that the recording density DQc3 of the cyan toner is at MAX, the recording density DPm1 of the magenta toner is "0" and the recording density DPy3 of the yellow toner takes an intermediate value (MID7) between MAX and "0".

Assuming in FIG. 4 that the color X moves linearly on the plane from P1 to N, the recording density DXbk of the black toner required for recording color X changes from "0" to MAX in proportion with the moving amount. In the same way, if the color X moves linearly on the plane from Q1 to N, it also changes from "0" to MAX in proportion with the moving amount. On the other hand, if the color X moves linearly on the plane from P1 to Q3, the recording density DXbk of the black toner remains "0" and is not recorded. However, although the recording density of the cyan toner remains unchanged at MAX, the recording density DXm of the magenta toner changes from MID1 to "0" in proportion with the moving amount and the recording density DXy of the yellow toner changes from "0" to MID7. Accordingly, since all of the recording densities of the cyan, magenta, yellow tones are positive in the intermediate portion between P1 and Q3, the recording density of the black toner corresponding to that of full black can not be obtained. However, also in this case, it is possible to conduct such a processing that the recording density near to that of full black is obtained for those colors near the achromatic color axis, and the recording density of the black toner more remote from full black is obtained as the color goes away from the achromatic color axis, that is, as the saturation goes higher. In addition, also in this case, recording of the black toner away from the full black for those colors of relatively high saturation can be adjusted by selecting an intermediate color for each of the chromatic colors P and Q.

As has been described above, according to the present invention, it is possible to obtain the recording density of the black toner corresponding to full black color for all colors, the recording density of the black toner near that of full black can be obtained for those colors near the achromatic color axis and the recording density of the black toner remote from the full black can be obtained for those colors of high saturation. In addition, according to the present invention, it is also possible to adjust recording density of the black color away from the full black for those colors of relatively high saturation. Moreover, the adjustment can be conducted on every boundary for the respective hue areas.

Further, although it has been assumed in the foregoing explanation that the maximum density values capable of recording of the cyan, magenta, yellow and black tones are identical with each other, the present invention is also applicable to such a case that the maximum density values capable of recording are not identical. In addition, although it has been explained such that at least one of the recording densities of the cyan, magenta, yellow and black toners for the achromatic color N and the chromatic colors P and Q take the greatest maximum density value capable of recording, this invention is not limited only thereto.

In the present invention, it is necessary to judge to which hue area among three or more predetermined hue areas the hue, represented by spectral density data Dr, Dg, Db obtained by color decomposition of colors to be recorded, belongs. Hereinafter, explanation is made for a method of judging the hue area.

As has been described above, according to the present invention, since the boundary for the hue area can be determined to an optional hue, it is possible to select such a hue that can be judged easily for the boundary of the hue areas.

That is, in the method of extracting the black color component according to the present invention, it is also possible to select hues used for judging the hue area, which judgement will be done, by comparing the spectral densities Dr, Dg and Db of the color to be recorded and reproduced with each other. For the hue as the boundary of the hue areas in this case, there are six candidates shown by the equation (9) and it is efficient to select three or more of them as the boundary for the hue areas.

$$\begin{cases} Hy : Dr = Dg \leq Db \\ Hb : Dr = Dg \geq DB \\ Hm : Db = Dr \leq Dg \\ Hg : Db = Dr \geq Dg \\ Hc : Dg = Db \leq Dr \\ Hr : Dg = Db \geq Dr \end{cases} \quad (9)$$

Now the present invention is to be explained assuming that all of six hues shown by the equation (9) are used as the boundary for the hue areas.

Figure 5:
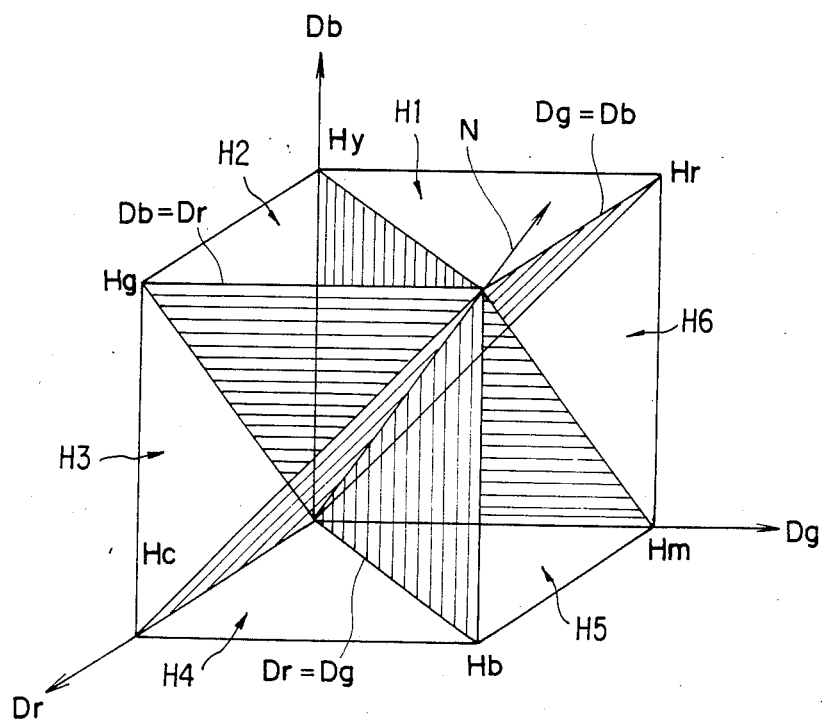
FIG. 5 is a graph illustrating a color space represented by three axes of Dr, Dg and Db.

FIG. 5 shows a case depicting $Dr = Dg$, $Dg = Db$, $Db = Dr$ in the color space (Dr, Dg, Db). In FIG. 5, $Dr = Dg$, $Dg = Db$, $Db = Dr$ represent planes passing the achromatic axis. Further, they are identical with the boundary planes of hues with respect to the achromatic color axis as the boundary, i.e., $Dr = Dg$ with hues Hy and Hb, $Dg = Db$ with hues Hc and Hr and $Db = Dr$ with hues Hm and Hg respectively.

Accordingly, if there is a color to be recorded and reproduced in the hue area put between the boundary planes of the hues Hr and Hy, the condition shown in the following equation (10) is established.

$Dr \leq Dg \leq Db$, between hue Hr – hue Hy (hue area H1) (10)

In the same manner, if a color is present or not in other hue areas is determined depending on the conditions:

$Dg \leq Dr \leq Db$, between hue Hy−hue Hg (hue area H2)  (11)

$Dg \leq Db \leq Dr$, between hue Hg−hue Hc (hue area H3)  (12)

$Db \leq Dg \leq Dr$, between hue Hm−hue Hr (hue area H4)  (13)

$Db \leq Dr \leq Dg$, between hue Hb−hue Hm (hue area H5)  (14)

$Dr \leq Db \leq Dg$, between hue Hm−hue Hr (hue area H6)  (15)

If a plurality of equations (10)–(15) are simultaneously established, any one of the hue areas may be selected.

As has been described above, according to the present invention, since the hue area can be judged by merely comparing the spectral densities Dr, Dg and Db for the color to be recorded and reproduced with each other, the processing for judging the hue areas can be realized easily.

The present invention is to be described referring to preferred embodiments thereof.

Figure 7A:
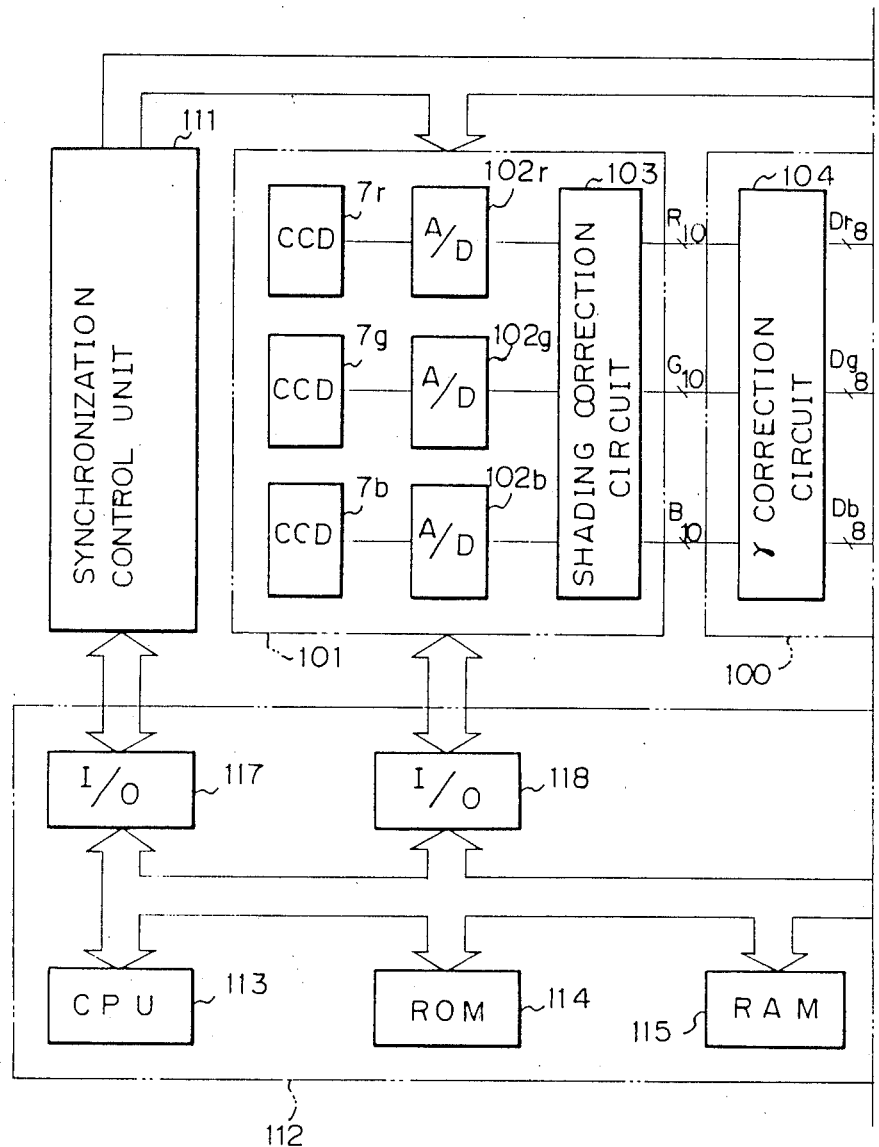
FIG. 7, constituted by FIG. 7a and FIG. 7b, is a schematic block diagram of a control unit of the copying machine of FIG. 6.
Figure 7B:
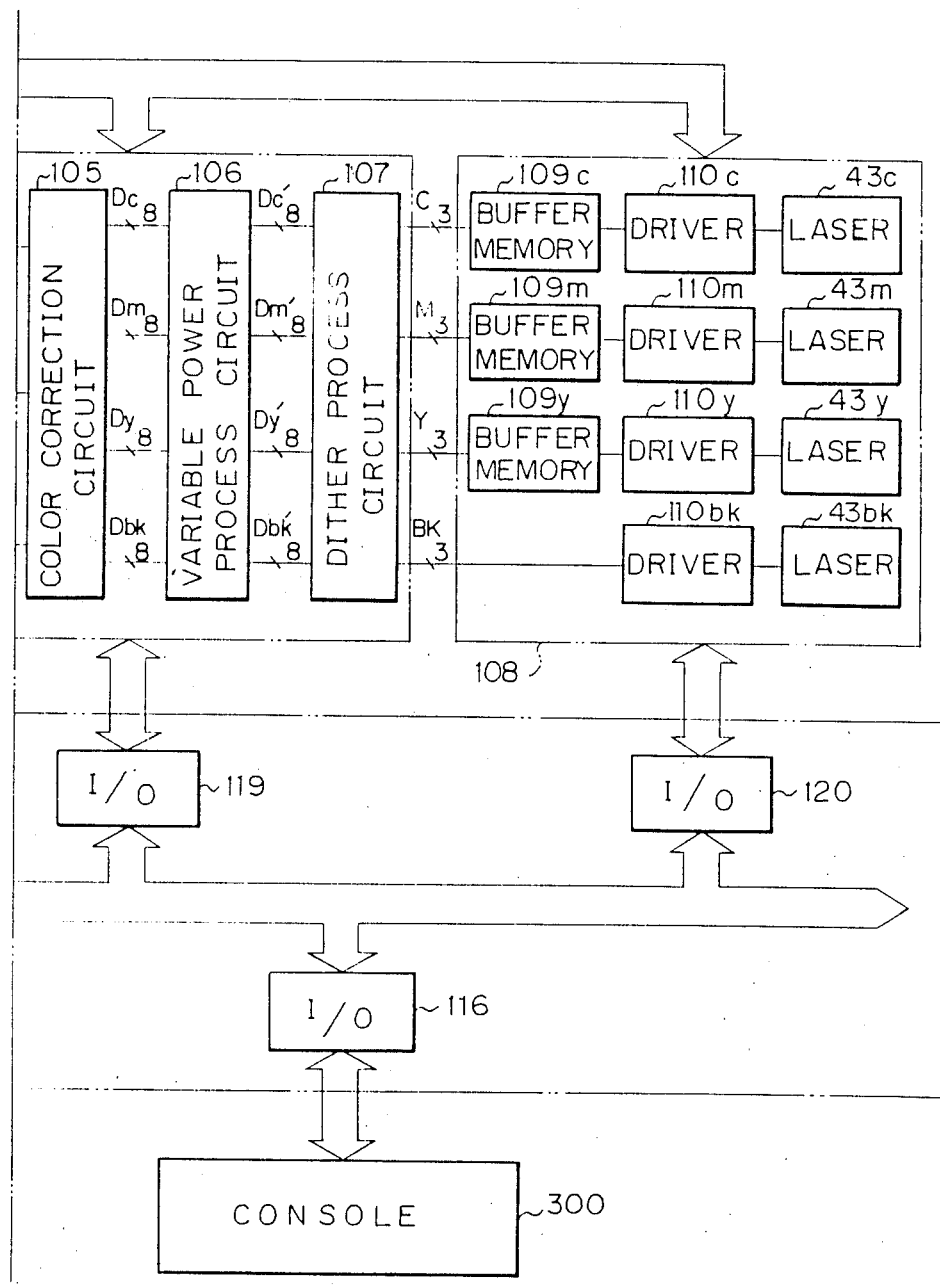

FIG. 6 schematically shows the structure of a mechanical section of a digital copying machine as one embodiment of the present invention, and FIG. 7 schematically shows the electronic circuit of the control unit of the copying machine of FIG. 6.

Referring first to FIG. 6, an original document 1 is placed on a platen (a contact glass plate) 2 and illuminated by original illuminating fluorescent lamps 3a and 3b. The reflected light from the original document 1 is reflected by movable first, second and third mirrors 4a, 4b and 4c, which enters via a focusing lens 5 into a dichroic prism 6 where the light is separated into red (R), green (G) and blue (B) light segments which are then input to solid-state image sensors comprising CCDs (Charge Coupled Devices) 7r, 7g and 7b, respectively.

The fluorescent lamps 3a and 3b and the first mirror 4a are mounted on a first carriage 8. The second and third mirrors 4b and 4c are mounted on a second carriage 9 which moves at half the speed of the first carriage 8. Thus, the length of the optical paths from the original 1 to the CCDs 7r, 7g and 7b is maintained constant. When an original image is read, the first and second carriages 8 and 9 are scanned from right to left. A carriage drive motor 10 has a shaft carrying thereon, a carriage drive pulley 11 around which a carriage drive wire 12 is wound to which wire the first carriage 8 is coupled. The wire 12 is further wound around a movable pulley (not shown) on the second carriage 9. Therefore, when the motor 10 is rotated forwardly and backwardly, the first and second carriages 8 and 9 move forwardly or scan to read the original image and return, respectively.

When the first carriage 8 is at a position shown in FIG. 6, namely at its home position, a home position sensor 39 comprising a reflective photosensor 39a and a light source 39b senses this state.

Figure 8:
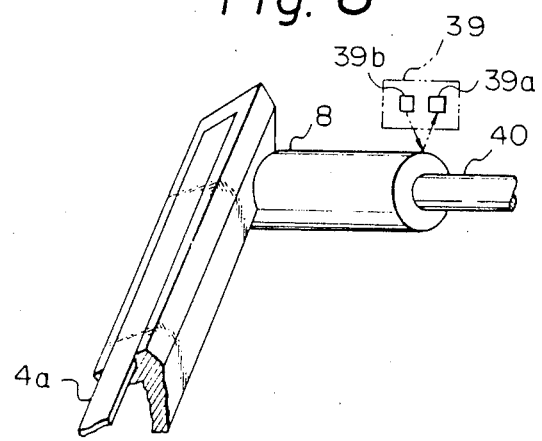
FIG. 8 is a perspective view, on enlarged scale, of a part of a first carriage shown in FIG. 6.

FIG. 8 shows the structure of the sensor in detail. When the first carriage 8 is moved rightward out of its home position to perform an optical scan, the sensor 39 is irradiated with light from the light source 39b. When the first carriage 8 returns to its home position, the sensor 39 is now irradiated with the reflected light from the light source 39b. When the sensor 39a changes from its light interruption state to its light reception state, the carriage 8 is controlled to stop.

As shown in FIG. 7, the output signals from the CCDs 7r, 7g and 7b in a reading process unit 101 are subjected to analog/digital conversion and then delivered to an image processing unit 100 where the signals are subjected to required processing and converted to binary signals representing print color information segments on black (BK), yellow (Y), magenta (M) and cyan (C). The binary signals are input to corresponding laser drivers 110bk, 110y, 100m and 110c which drive corresponding semiconductor lasers 43bk, 43y, 43m and 43c. Thus, the respective lasers output laser beams modulated by the binary print color signals.

In FIG. 6, the laser beams output from the semiconductor lasers 43bk, 43y, 43m and 43c (not shown in FIG., 6) are reflected by rotary multimirrors 13bk, 13y, 13m and 13c, fed via f - ½ lenses 14bk, 14y, 14m and 14c which correct a curve at each of the ends of the scanned surface, reflected sequentially by fourth mirrors 15bk, 15y, 15m and 15c and fifth mirrors 16bk, 16y, 16m and 16c, passed through cylindrical lenses 17bk, 17y, 17m and 17c for multimirror tilt correction, and irradiated onto photosensitive drums 18bk, 18y, 18m and 18c for focusing purposes.

The rotary multimirrors 13bk, 13y, 13m and 13c are fixed to the corresponding rotational shafts of multimirror drive motors 41bk, 41y, 41m and 41c which are rotated at a fixed speed to drive the multimirrors at a constant speed. By the rotation of the multimirrors, the laser beams are scanned in a direction perpendicular to the direction of rotation of the photosensitive drums (clockwise in FIG. 6), namely, along the rotational shafts of the drums.

Figure 9:
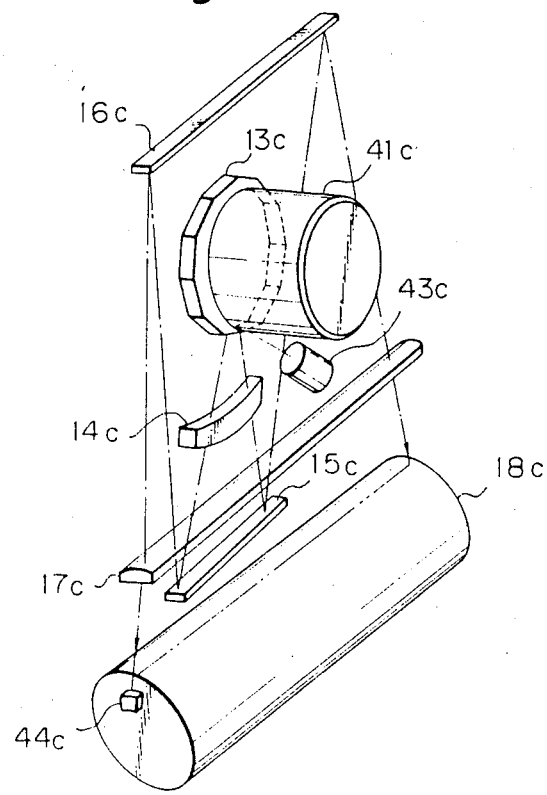
FIG. 9 is a perspective exploded view of a BK printing unit shown in FIG. 6.

FIG. 9 shows in detail a laser scanning system of a cyan color printing device as one example of the laser scanning systems. Reference numeral 43c denotes a semiconductor laser. As shown by the dot-dot-dashed line in FIG. 9, the laser beam is scanned along the rotational shaft of the photosensitive drums 18c. A sensor 44c comprising a photoelectric conversion device which detects laser beams is provided at one end of the drum 18c on the line of scanning laser beams. When the sensor 44c changes from a state where it has detected the laser beam to a state where it does not detect the beam, the scanning of one line starts. The output signal (pulse), representing the laser beam detection, from the sensor 44c is processed as a line synchronizing pulse for laser scanning. The magenta, yellow and black printing devices are quite the same in structure as the cyan printing device of FIG. 9.

In FIG. 6, the surfaces of the photosensitive drums are charged uniformly by scorotrons (chargers) 19bk, 19y, 19m and 19c connected to a negative high voltage generator (not shown). When the uniformly charged photosensitive drum surfaces are irradiated with a laser beam modulated by a printing signal, the electric charges on the irradiated portion of the drums flow to the system ground and thus disappear due to a photoconductive phenomenon. In that case, the lasers are controlled such that they are not lighted for a portion corresponding to a high density portion of the original, but lighted for a portion corresponding to a lower density portion of the original. The surface portions of the drums 18bk, 18y, 18m and 18c corresponding to the high density portion are charged to a potential of −800 volts while the drum surface portions corresponding to the lower density portion are charged to −100 volts or so and thus an electrostatic latent image is formed corresponding to the light and shade of the original. The latent images are developed by black, yellow, magenta and cyan developing units 20bk, 20y, 20m and 20c, and thus black, yellow, magenta and cyan toner images are formed on the drums 18bk, 18y, 18m and 18c, respectively.

The toners within the respective developing units are positively charged by stirring and the developing units each are impressed with a developing bias of about −200 volts by a developing bias generator (not shown). Therefore, the toners adhere to the portion of the drum surfaces where the surface potentials are below the developing bias thereby to form toner images corresponding to the original image.

Printing sheet 38 accommodated in a transfer paper cassette 22 is fed out by a feed-out roller 23 and delivered by registration rollers 24 onto a transfer belt 25 with predetermined timing. The printing paper placed on the transfer belt 25 is passed sequentially below the drums 18bk, 18y, 18m and 18c by the movement of the transfer belt 25. During the sequential passage below these drums, black, yellow, magenta and cyan toner images are sequentially transferred onto the printing paper by the action of corotrons (transfer chargers) 29bk, 29y, 29m and 29c below the transfer belt 25. The printing paper with the transferred toner images thereon is then delivered to a thermal fixing unit 36 where the toners are fixed to the printing paper and the printing paper is then discharged to a tray 37.

The toners remaining on the drums after the transfer operation are removed by cleaner units 21bk, 21y, 21m and 21c.

The black toner collecting cleaner unit 21bk and black color developing unit 20bk are coupled through a toner collecting pipe 42 to return the black toner collected by the cleaner unit 21bk to the developing unit 20bk. However, since the yellow, magenta and cyan toners collected by other cleaner units 21y, 21m and 21c contain different color toners from the preceding stages, they are not reused. For example, in transfer, the black toner is reversely transferred from the printing paper onto the drum 18y and thus the cleaner unit 21y collects not only yellow toner but also black toner. Therefore, the collected yellow toner is never reused.

The developing units have corresponding toner density sensors 45bk, 45y, 45m and 45c which output signals indicative of the densities of the toners in the developing units to a toner density control unit (not shown). The toner density control unit outputs toner supplement signals in accordance with the outputs from the toner density sensors to supplement quantities of toners consumed for toner image formation in order to maintain the toner densities constant at the respective developing units. In response to these toner supplement signals, toner supplement motors (not shown) provided at the corresponding developing units are driven. Mounted to the respective rotational shafts of the toner supplement motors are toner supplement rollers 46bk, 46y, 46m and 46c which have grooves through which the corresponding toners are conveyed. In response to the toner supplement signals, the toner supplement rollers are moved to supplement the toners from upper toner containers to the corresponding developing units.

The transfer belt 25 which conveys the printing paper from the drum 18bk to drum 18c extends around an idle roller 26, a drive roller 27 and idle rollers 28 and 30 and is driven counterclockwise by the drive roller 27. The drive roller 27 is pivoted at the left-hand end of a lever 31 pivoted at a shaft 32. Pivoted at the right-hand end point 33 of the lever 31 is a plunger 35 of a black mode setting solenoid (not shown). A compression coil spring 34 is disposed between the plunger 35 and the shaft 32 and applies a clockwise torque to the lever 31.

When the black mode setting solenoid is not energized, i.e., is in a color operation mode, the transfer belt 25 for placing the printing paper thereon contacts with the drum 44bk, 44y, 44m and 44c, as shown by the solid lines in FIG. 6. Under such conditions, when printing paper is placed on the belt 25 and toner images are formed on all the drums, respective toner images are transferred to the printing paper, as the recording paper moves (the color operation mode). When the black mode setting solenoid is energized (black operation mode), the lever 31 is turned counterclockwise against the repulsive force of the spring 34. This causes the drive roller 27 to lower about 5 millimeters and the transfer belt 25 moves away from the drums 44y, 44m and 44c, but is kept in contact with the drum 44bk. Under such conditions, the printing paper on the transfer belt 25 contacts only with the drum 44bk, so that the black toner image alone is transferred to the printing paper. Since the printing paper does not contact with the drums 44y, 44m and 44c, the remaining toner adhering to those drums does not adhere to the printing paper, spots of yellow, magenta, cyan, etc., do not appear at all on the printing paper Thus by the copying in the black operation mode, a copy similar to that obtained by a regular black monochromatic copying machine is provided.

Figure 10:
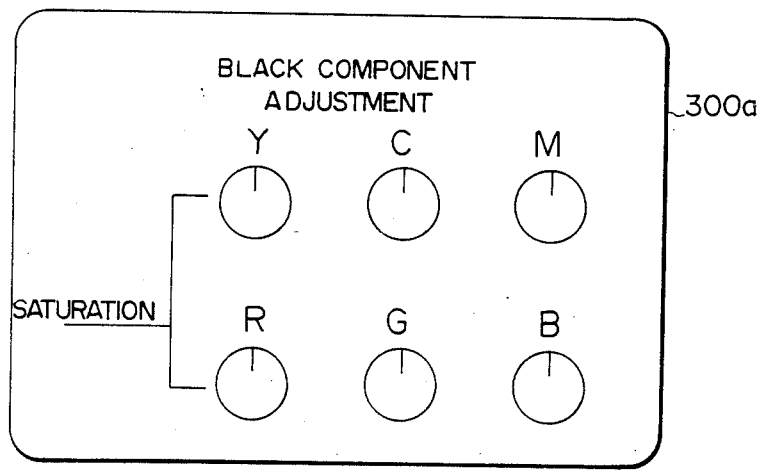
FIG. 10 is a front view, on enlarged scale, of a black color adjustment part of a console board shown in FIG. 6.

FIG. 10 shows the appearance of a black component adjustment part 300a which is a part of a console board 300 of the device in FIG. 6. As shown in FIG. 10, the black color adjustment part is provided with six knobs for saturation adjustment and three knobs for hue adjustment. Each of the knobs is coupled to a sliding shaft of a variable resistor not illustrated. The function of the black color adjustment part is to be described specifically later.

Figure 11:
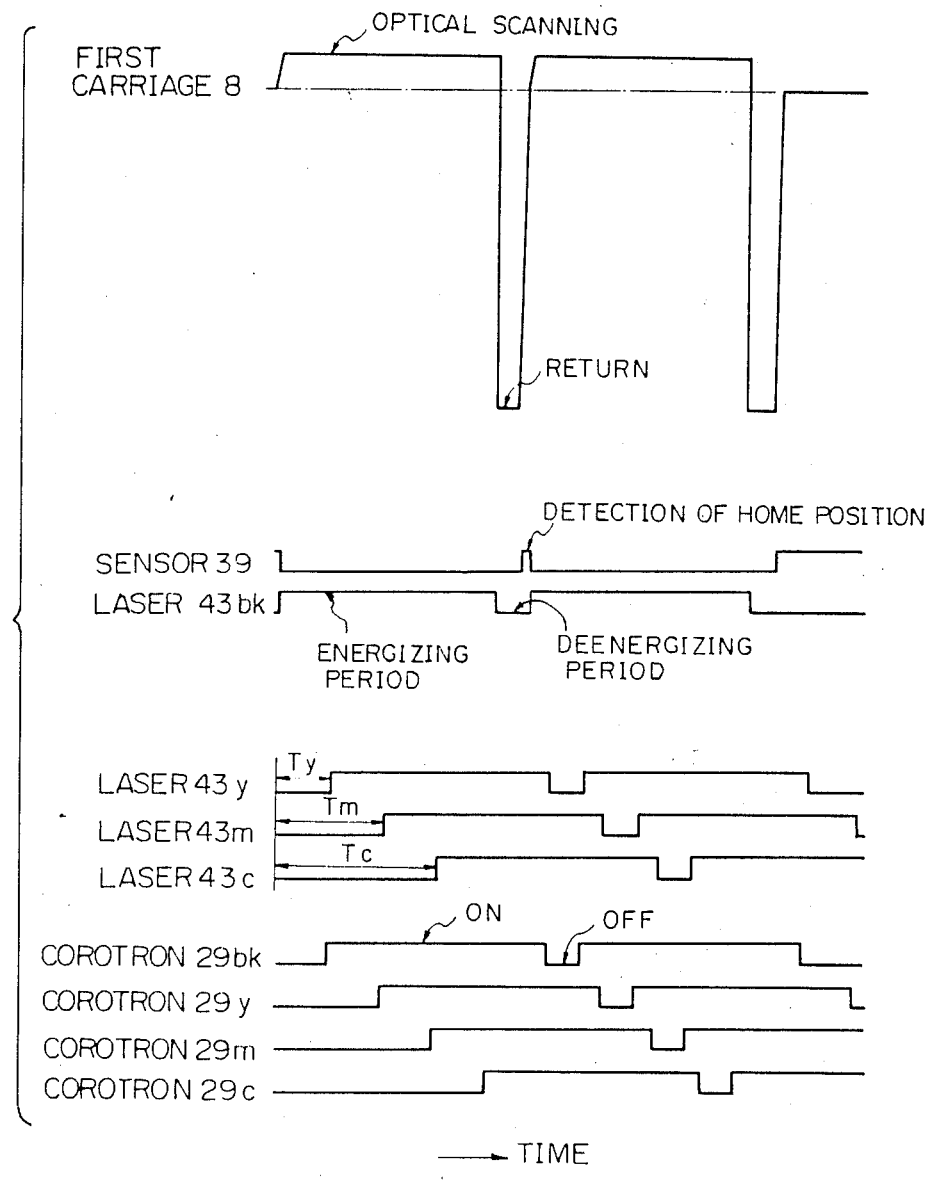
FIG. 11 is a chart showing the relationship in time among original document reading scan, printing and transfer operations of the embodiment of FIG. 6.

Referring to the time chart shown in FIG. 11, the operation timing of the main elements of the copying mechanism will be described FIG. 11 concerns the formation of the two same full color copies. When the optical scanning of the first carriage 8 starts, black and white density reference plates 47 and 48 of FIG. 6 are read. Each of the plates 47 and 48 has a certain width external along the first carriage 8. The shading correction is performed by correction data based on the read densities of the plates 47 and 48 by means of a shading correction circuit 103 shown in FIG. 7. Substantially simultaneously with the start of the scanning of the original, the laser 43bk starts a modulating excitation on the basis of a record signal. The lasers 43y, 43m and 43c start the corresponding modulating excitation operations delayed by times Ty, Tm, Tc taken for the transfer belt 25 to travel the respective distances between the photosensitive drum 44bk and the respective drums 44y, 44m and 44c. The corotrons 29bk, 29y, 29m and 29c are energized delayed by predetermined times from the start of the modulating excitation operations of the lasers 43bk, 43y, 43m and 43c (by the times taken for the parts of the photosensitive drum surfaces irradiated with laser teams to rotate to the corresponding positions of the corotrons).

Referring to FIG. 7, the reading processing unit 101 reads an image on an original. The output signals from the CCDs 7r, 7g and 7b are converted by A/D converters 102r, 102g and 102b to 10-bit digital signals which are then applied to a shading correction circuit 103. The shading correction circuit 103 corrects uneven illumination of the CCD reading optical systems, and uneven sensitivities of, and uneven dark currents in, the photodetection elements in each of the CCDs and outputs the respective 10-bit read color gradation signals R, G and B. The shading correction circuit 103 is constituted by a memory means for storing the read densities of the plates 47 and 48, means for producing a signal representative of an inverse number of the read densities and a multiplexer.

The image processing unit 100 includes a γ-correction circuit 104, a color correction circuit 105, a variable power process circuit 106 and a dither process circuit 107. The γ-correction circuit 104, constituted by a table of RAM (Random Access Memory), first performs a logarithmic conversion on the read color gradation signals R, G and B applied thereto. Then it corrects the gradation characteristic of the converted signals in accordance with the instruction from the console board 300, and outputs 8-bit read color density signals Dr, Dg and Db for R, G and B.

The color correction circuit 105 performs a masking operation. Namely, it converts input R, G and B signals Dr, Dg and Db to signals Dc, Dm, Dy and Dbk corresponding to C (cyan), M (magenta), Y (yellow) and BK (black) printing colors and the respective toner densities. In this conversion, basic color correction may be performed to correct a deviation from the ideal printing characteristic of the device itself and additional color correction may be carried out in accordance with the instruction from the console board 300.

The respective 8-bit printing color density signals Dc, Dm, Dy and Bbk output from the color correction circuit 105 are applied to the variable power process circuit 106 which performs power varying operations on the corresponding color signals in the direction of main scanning (perpendicular to the direction of movement of the first carriage 8) in accordance with an instruction from the console board 300, and outputs the corresponding 8-bits printing color density signals Dc', Dm', Dy' and Dbk'. A power variation change in the subscanning direction (in the direction of movement of the first carriage 8) is performed by changing the moving speed of the first carriage 8. This variable power process circuit 106 is provided with, for each color, a line buffer and a clock controller, not shown. The clock controller counts synchronous signals (clock signals) from a synchronization control unit 111 and feeds a signal depending upon the instruction from the console board 300. The line buffer passes therethrough the printing color density signal during one-to-one operation, thins out the printing color density signal during reduction operation and interpolates the printing color density signal during enlargement operation.

The output signal from the power process circuit 106 is applied to the dither process circuit 107 which performs a dither operation on the printing density signals Dc', Dm', Dy' and Dbk' and outputs the respective 3-bit printing color gradation signals C, M, Y and BK. In the dither processing operation, nonlinearity of the gradation of the printing system is also corrected. The dither process circuit 107 is provided with tables constituted by ROM (Read Only Memory) and counters, not shown. The counters count signals from the synchronization control unit 111 to detect where in the image area each of the printing density signals is located. The detected location signals are applied to the address input of the ROM. To the address input, the printing density signals Dc', Dm', Dy' and Dbk' are also applied and thus the respective 3-bit printing color gradation signals C, M, Y and BK are outputted.

In an image printing unit 108, the semiconductor lasers 43c, 43m, 43y and 43bk are energized in accordance with the printing color gradation signals C, M, Y and BK output from the image process unit 100. The BK signal is applied directly to a laser driver 110bk while the other color signals Y, M and C are temporarily stored in buffer memories 109y, 109m and 109c, respectively. When delay times Ty, Tm and Tc shown in FIG. 6 have passed after the BK signal is applied to laser driver 110bk, the contents of the buffer memories 109y, 109m and 109c are read and applied to laser drivers 110y, 110m and 110c, respectively.

The synchronization control unit 111 adjusts input and output timing of signals among the read processing unit 101, image processing unit 100 and image printing unit 108, and among the elements of each of the units 101, 100 and 108.

A system control unit 112 includes a microcomputer system which comprises a CPU (Central Processing Unit) 113, a ROM (Read Only Memory) 114, a RAM (Random Access Memory) 115, I/0 (Input/Output) ports 116, 117, 118, 119 and 120 to control the whole copying machine.

The system control unit 112 provides synchronization control for the synchronization control unit 111, control of the circuits 104 to 107 and the display control of and the detection of the keying operation at the console board 300 and performs predetermined operations in accordance with keyed inputs.

As has been described hereinbefore in principle and will be explained in detail later, the color correction circuit 105 extracts the recording density Dbk of black color component from image data Dr, Dg, Db, as well as converts and corrects read color information to the density information of recorded colors C, M and Y in accordance with the characteristic of spectral reflection wavelength of recording image forming toners. Namely, the circuit 105 changes the extraction parameters (constants KNr', Kng', KNb') for black color component and masking coefficients (color correction parameters) in hue areas H1 to H6 in accordance with a hue adjustment indication input from the console board 300. Then, the circuit 105 judges the read color informations as to which of hue areas H1 to H6 they belong by comparing the spectral densities Dr, Dg and Db of the color with each other. After that, the circuit 105 extracts the black color component based on the extraction parameters of black color component (calculation for Dbk) designated to the judged area, and conducts calculations for the above-mentioned conversion and correction based on masking coefficients.

Figure 12:
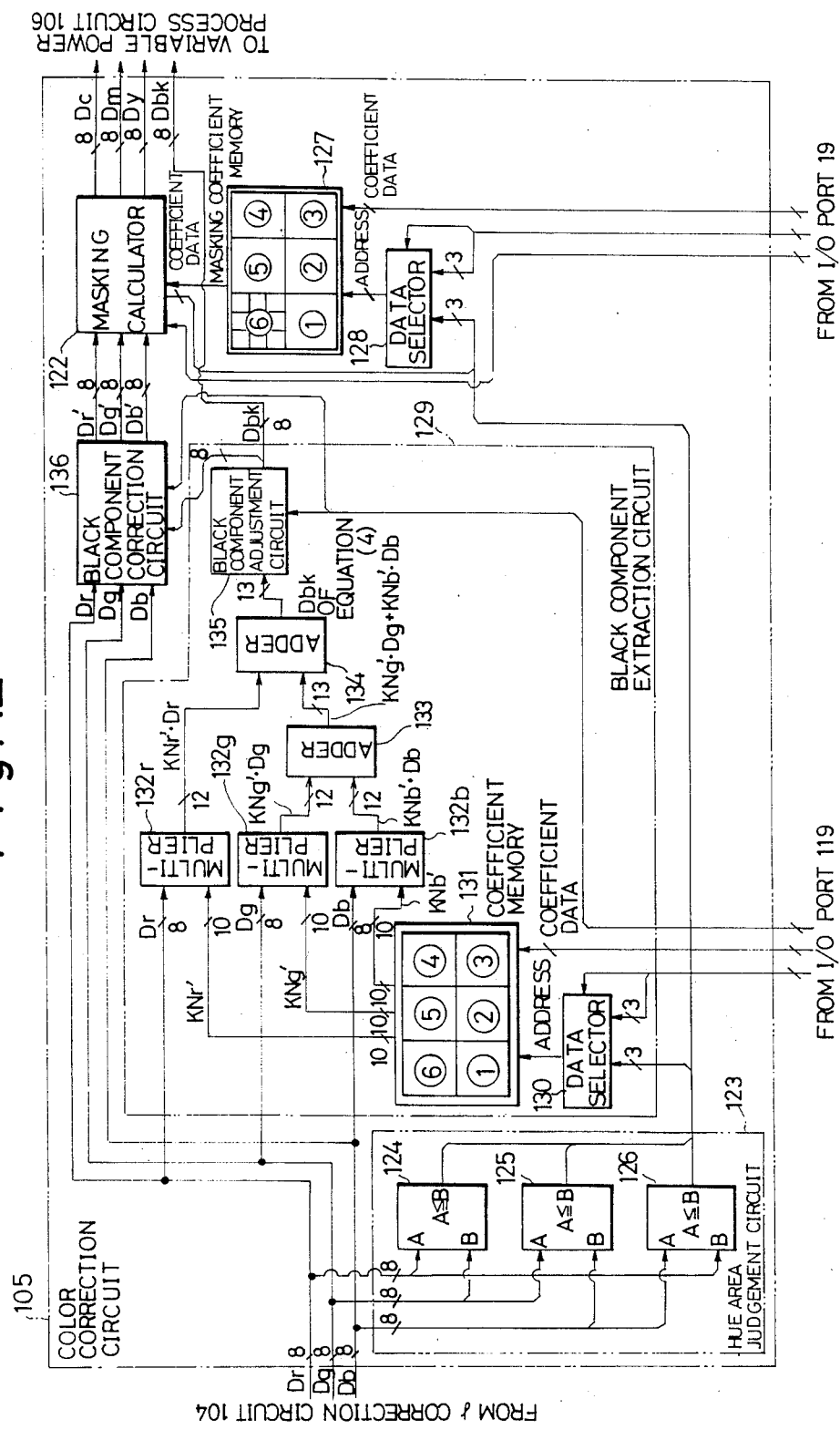
FIG. 12 is a block diagram of an embodiment of a color correction circuit of FIG. 6.

FIG. 12 shows one embodiment of the color correction circuit 105. The constitution and the operation of the color correction circuit 105 shown in FIG. 12 are now explained.

In this embodiment, the color correction circuit 105 includes a hue area judgement circuit 123, a black component extraction circuit 129, a black component correction circuit 136, a masking coefficient memory 127, and a masking calculator 122. The hue area judgement circuit 123 comprises three comparators 124 to 126. The comparators 124 to 126 generate outputs shown in Table 1.

TABLE 1

| Comparator | Input | Output | | | | | | |
|---|---|---|---|---|---|---|---|---|
| 124 | Dr, Dg | H | L | L | L | H | H | H |
| 125 | Dg, Db | H | H | H | L | L | L | H |
| 126 | Db, Dr | L | L | H | H | H | L | H |
| Area judgement | (Memory read area) | H1 | H2 | H3 | H4 | H5 | H6 | |

The area judged output is applied to the black component extraction circuit 129 as the data (black component extraction parameters) group address data, as well as by way of a data selector 128 to the masking coefficient memory 127 as the data (color correction parameters) group address data.

As has been described above, in this embodiment, the hue area judgement circuit 123 is realized with a simple constitution. Further, since all bits for the image data Dr, Dg and Db are used upon judging the hue area, there is also a merit that no judging error is caused.

The black component extraction circuit 129 is a circuit used for processing the image data Dr, Dg, Db in accordance with hue judging signals outputted from the hue area judgement circuit 123 and outputs BK recording density data Dbk and it comprises a data selector 130, a coefficient memory 131, multipliers 132r, 132g, 132b, adders 133, 134 and a black component adjustment circuit 135.

When a copy start input is applied to the console board 300, the CPU 113 of the control system 112 calculates the extraction parameters for black color component to be designated to the hue areas H1 to H6 respectively (KNr', KNg', KNb') as described with reference to equations (3) and (4) and writes them into the coefficient memory 31. For example, if the output from the hue area judgement circuit 123 designates the area H1 the coefficient memory 131 reads out the extraction parameters for black color component (KNr', KNg', KNb') allocated to the area H1 and applies them to the multipliers 132r, 132g and 132b. Each of the extraction parameters (the coefficients as shown by the equation (4)) has 10-bits.

The multiplier 132 multiplies the image data Dr and the coefficient KNr', the multiplier 132g multiplies the image data Dg and the coefficient KNg' and the multiplier 132b multiplies the image data Db and the coefficient KNb' and they output the upper 12 bits of the respective calculation products: Dr·KNr', Dg·KNg' and Db·KNb' to the adders 134 and 133. The adder outputs the data representing Dg·KNg'+Db·KNb', while the adder 134 outputs the data (Dbk) representing the value of Dr·KNr'+Dg·KNg' +Db·KNb' on the right side in the equation (3) above to the black component adjustment circuit 135.

The black component adjustment circuit 135 corrects the overflow and the underflow for the value outputted from the adder 134 as well as performs Dbk output processing in accordance with the black BK recording mode signal from the CPU 113 of the control system 112. The black BK recording mode includes four color recording of Y, M, C and BK, three color recording for only Y, M and C, monochromatic recording for only BK, etc. When the four color recording is designated, the black component adjustment circuit 135 outputs Dbk, while the black color correction circuit 136 outputs the image data Dr', Dg', Db' obtained by reducing Dbk from the image data Dr, Dg, Db to the masking calculator 122. When the three color recording is designated, the black component adjustment circuit 135 interrupts Dbk, while the black component correction circuit 136 outputs the image data Dr, Dg, Db as they are to the masking calculator 122. When the BK monochromatic recording is designated, the black component adjustment circuit 135 outputs Dbk, while the black component correction circuit 136 does not apply image data to the masking calculator 122.

When the four-color recording is designated, the black component correction circuit 136 processes the image data Dr, Dg, Db in accordance with Dbk outputted from the black component extraction circuit 129 and performs a processing for correcting the BK recording density for Dbk from the image data Dr, Dg, Db. The content of the correction is basically represented by the following equation. The corrected image data Dr', Dg', Db' are applied to the masking calculator 122.

$$Dr' = Dr - Dbk \quad (16)$$
$$Dg' = Dg - Dbk$$
$$Db' = Db - Dbk$$

The masking calculator 122 calculates the recording color density data Dc, Dm, Dy representing the respective recording densities of cyan toner, magenta toner and yellow toner for recording by the following equation (17).

$$Dc = KCr \cdot Dr + KCg \cdot Dg + KCb \cdot Db \quad (17)$$
$$Dm = KMr \cdot Dr + KMg \cdot Dg + KMb \cdot Db$$
$$Dy = KYr \cdot Dr + KYg \cdot Dg + KYb \cdot Db$$

in which KCr, KCg, KCb, KMr, KMg, KMb, KYr, KYg, KYb region represent masking coefficients (one group each for areas H1 to H6, 6 groups in total), and the group is designated by the region judging output of the comparators 124 to 126 (Table 1), read out from the masking coefficient memory 127 and applied to the calculator 122.

When a copy start indication signal reaches from the console board 300, the CPU 113 of the control system 112 calculates the, masking coefficients for the respective areas H1 to H6 and writes them into the masking coefficient memory 127 in accordance with the input of the hue adjustment means on the console board 300.

Accordingly, when the reading color information comes from the image reading circuit 101 (start for original document image reading), the hue area judgement circuit 123 in the color correction circuit 105 detects the area which the arriving reading color density data Dr, Dg, Db belong to and applies the data indicating the judged area (Table 1) to the black component extraction parameter memory (coefficient memory) 131 and the masking coefficient memory 127. The data indicating the judged area (Table 1) designate each one of the black component extraction parameter group (H1 to H6: each of the groups comprises three coefficients) and color correction data groups H1 to H6: each of the groups comprises 9 masking coefficients). Each of the data of the color correction data groups is designated by the masking calculator 122. The masking calculator 122 calculates the recording color density data Dc, Dm and Dy from the masking coefficient data thus read out from the memory 127 and the image data Dr', Dg', Db' as the input in accordance with the equation

(17) and applies them to a variable power process circuit 106.

The data selector 130 and 128 select the input address data line. The CPU 113 applies a selection indication signal to the data selectors 130 and 128 so that the address line of the control system 112 is connected to the address input terminals of the memories 130 and 127 when writing the black component extraction parameters and the masking coefficients calculated from the CPU 113 to the memory 131 and the memory 127 respectively before copy start (in response to the input of copy start). During the subsequent image data processing, the CPU 113 applies a selection indication signal to the data selectors 130 and 128 so that the output of the hue area judgement circuit 123 is connected to the address input terminal of the memory 131 as the group address data and so that the output from the circuit 123 and the address data from the masking calculator 122 are connected to the address input terminal of the memory 127 as the coefficient designation data in the group.

Then, a method of determining the processing coefficient by the color correction circuit 105 described above is explained.

Description is at first made to a method for determining each of the coefficients of the masking circuit 124.

For determining each of the coefficients, it is necessary to define chromatic colors R, Y, G, C, B and M on the boundary areas for the hues Hr, Hy, Hg, Hc, Hb and Hm and achromatic color N on the achromatic color axis shown in FIG. 5.

It is assumed here that those high saturation colors with which at least one of the recording densities for cyan, magenta or yellow toners for such colors take the maximum density value capable of recording are selected as the chromatic colors R, Y, G, C, B and M. That is, colors of the relationship shown by the following equation are selected:

$$\begin{cases} DRc = O \\ DRm = Dm\text{max} \quad \text{or } DRy = Dy\text{max} \\ DTc = O \quad \text{or } DYm = O \\ DYy = Dy\text{max} \\ Dgm = O \\ DGc = Dc\text{max} \quad \text{or } DGy = Dy\text{max} \\ DCc = Dc\text{max} \\ DCm = O \quad \text{or } DCy = O \\ DBc = Dc\text{max} \quad \text{or } DBm = Dm\text{max} \\ DBy = O \\ DMc = O \quad \text{or } DMy = O \\ DMm = Dm\text{max} \end{cases} \quad (18)$$

where (DRc, DRm, DRy), (DYc, DYm, DYy), (DGc, DGm, DGy), (DCc, DCm, DCy), (DBc, DBm, Dby) and (DMc, DMm, DMy) represent the recording densities for the chromatic colors R, Y, G, C, B, M respectively, and Dcmax, Dmmax, Dymax represent, respectively, the maximum values of the density capable of recording for the cyan, magenta and yellow toners.

Further, as the achromatic color N, a color that takes the maximum value Dbkmax for the density capable of recording of the black toner is selected That is, a color having the relationship represented by the following equation is selected:

$$DNc = CNm = DNy = Dbkmax \quad (19)$$

where DNc, DNm, DNy represent, respectively, the recording densities of cyan, magenta and yellow required for recording the achromatic color N.

Under the conditions as described above, the recording density for each of colors is determined depending on the characteristics of the image reading apparatus and the image recording apparatus employed. In the masking processing described above, the black toner recording density is not considered.

When each of the color recording densities is determined as has been described above, the coefficients of the equation (17) in each of the regions are determined by matrixes shown in Table 2. The spectral densities for the chromatic colors R, Y, G, C and B are, respectively, (DRr, DRg, DRb), (DYr, DYg, DYb), (DGr, DGg, DGb), (DCr, DCg, DCb), (DBr, DBg, DBb) and (DMg, DMg, DMb) and the spectral density for the achromatic color N is (DNr, DNg, DNb).

Further, the combination of the spectral density and the recording density for each of the colors is generally determined in accordance with the characteristics of the image reading apparatus and the image recording apparatus employed Specifically, those combinations capable of providing satisfactory color reproduction are used.

TABLE 2

| Area | Coefficient for color correction processing |
|---|---|
| Between HR-HY | $\begin{bmatrix} DRc & DYc & DNc \\ DRm & DYm & DNm \\ DRy & DYy & DNy \end{bmatrix} \times \begin{bmatrix} DRr & DYr & DNr \\ DRg & DYg & DNg \\ DRb & DYb & DNb \end{bmatrix}^{-1}$ |
| Between HY-HG | $\begin{bmatrix} DYc & DGc & DNc \\ DYm & DGm & DNm \\ DYy & DGy & DNy \end{bmatrix} \times \begin{bmatrix} DYr & DGr & DNr \\ DYg & DGg & DNg \\ DYb & DGb & DNb \end{bmatrix}^{-1}$ |
| Between HG-HC | $\begin{bmatrix} DGc & DCc & DNc \\ DGm & DCm & DNm \\ DGy & DCy & DNy \end{bmatrix} \times \begin{bmatrix} DGr & DCr & DNr \\ DGg & DCg & DNg \\ DGb & DCb & DNb \end{bmatrix}^{-1}$ |
| Between HC-HB | $\begin{bmatrix} DCc & DBc & DNc \\ DCm & DBm & DNm \\ DCy & DBy & DNy \end{bmatrix} \times \begin{bmatrix} DCr & DBr & DNr \\ DCg & DBg & DNg \\ DCb & DBb & DNb \end{bmatrix}^{-1}$ |
| Between HB-HM | $\begin{bmatrix} DBc & DMc & DNc \\ DBm & DMm & DNm \\ DBy & DMy & DNy \end{bmatrix} \times \begin{bmatrix} DBr & DMr & DNr \\ DBg & DMg & DNg \\ DBb & DMb & DNb \end{bmatrix}^{-1}$ |
| Between HM-HR | $\begin{bmatrix} DMc & DRc & DNc \\ DMm & DRm & DNm \\ DMy & DRy & DNy \end{bmatrix} \times \begin{bmatrix} DMr & DRr & DNr \\ DMg & DRg & DNg \\ DMb & DRb & DNb \end{bmatrix}^{-1}$ |

Then, a method of determining each of coefficients of the black component extraction circuit 129 is explained.

For determining each of the coefficients, it is necessary to define chromatic colors R', Y', G', C', B' and M' on the boundary planes for the hues Hr, Hy, Hg, Hc, Hb and Hm and to define an achromatic color N' on the achromatic color axis shown in FIG. 5.

Description is to be made herein for the case of reducing the recording density of the black toner relative to a relatively high saturation color in the hue area Hr–Hy Such a processing has an effect of increasing the gradation reproducibility for skin color by reducing the recording density of the black toner in the hue area containing the skin color, that is, the hue area Hr–Hy. In this case, intermediate colors are selected for chromatic colors R', Y' and high saturation colors are selected for the chromatic colors G', C', B' and M'.

For easier explanation, it is assumed here that identical colors with the chromatic colors, G, C, B and M described above are used as the chromatic colors G', C', B'and M', while the identical color with the achromatic color N as described above is used as the achromatic color N'. It is further selected a color for which the recording density of cyan toner takes $\frac{1}{2}$ of the maximum density value capable of recording and at least one of the recording density of magenta or yellow toner takes the maximum density value capable of recording as the chromatic color R'. There is further selected a color for which the recording density of cyan or magenta toner takes $\frac{1}{2}$ of the maximum density value capable of recording and the recording density of yellow toner takes the maximum density value capable of recording as the chromatic color Y'. That is, colors having the relationship represented by the following equation are selected:

$$\begin{cases} DRc' = Dc\text{max}/2 \\ DRm' = Dm\text{max} \quad \text{or } DRy' = Dy\text{max} \\ DYc' = Dc\text{max}/2 \quad \text{or } DYm' = Dm\text{max}/2 \\ DYy' = Dy\text{max} \end{cases} \quad (20)$$

in which (DRc', DRm', DRy') and (DYc', DYm', DYy') represent the recording densities for the chromatic colors R' and Y' respectively.

When the recording density for each of the colors is determined as above, the 3×3 matrix part for the equation (3) in each of the areas takes a value as shown in Table 3. The spectral densities for the chromatic colors R' and Y' are, respectively, (DRr', DRg', DRb') and (DYr', DYg', DYb'). Accordingly, the coefficient of the equation (4) in each of the areas takes a value obtained by multiplying the term corresponding to m in Table 3 (refer to the equation (3)) with Dbkmax.

The processing coefficient of the color correction circuit 105 is determined as described above. Further, the embodiment shown in FIG. 12 is so adapted that an external control unit 112 performs these calculations based on the previously determined spectral densities and recording densities for each of the colors and writes them to the coefficient memory 131, etc.

Although the chromatic colors P, Q (DPbk=DQbk=0) are used for determining the coefficients in the black component extraction processing, it is not limited only thereto. For instance, it will be apparent that similar effect can also be obtained by utilizing the color P' shown in FIG. 2a instead of the chromatic color P.

Further, although it has been explained in the foregoing that the recording densities DNc, DNm, DNy for cyan, magenta and yellow toners for achromatic color N are "0", this invention is not limited only thereto. For instance, assuming the spectral densities for the achromatic color N as (DNr, DNg, DNb) and the recording densities of cyan, magenta, yellow and black toners required for recording the achromatic color N as (DNc, DNm, DNy, DNk), even if there is a relationship : DNr=DNg=DNb  DNc=CNm=DNy  0  and DNbk=DNr−DNc, it only gives a result that the recording density of black toner slightly different from full black is obtained with respect to colors near to the achromatic color axis.

TABLE 3

| Area | 3 × 3 matrix |
|---|---|
| Between HR-HY | $\begin{bmatrix} DNr & DRr' & DYr' \\ DNg & DRg' & DYg' \\ DNb & DRb' & DYb' \end{bmatrix}^{-1}$ |
| Between HY-HG | $\begin{bmatrix} DNr & DYr' & DGr' \\ DNg & DYg' & DGg' \\ DNb & DYb' & DGb' \end{bmatrix}^{-1}$ |
| Between HG-HC | $\begin{bmatrix} DNr & DGr & DCr \\ DNg & DGg & DCg \\ DNb & DGb & DCb \end{bmatrix}^{-1}$ |
| Between HC-HB | $\begin{bmatrix} DNr & DCr & DBr \\ DNg & DCg & DBg \\ DNb & DCb & DBb \end{bmatrix}^{-1}$ |
| Between HB-HM | $\begin{bmatrix} DNr & DBr & DMr \\ DNg & DBg & DMg \\ DNb & DBb & DMb \end{bmatrix}^{-1}$ |
| Between HM-HR | $\begin{bmatrix} DNr & DMr & DRr' \\ DNg & DMg & DRg' \\ DNb & DMb & DRb' \end{bmatrix}^{-1}$ |

Figure 13:
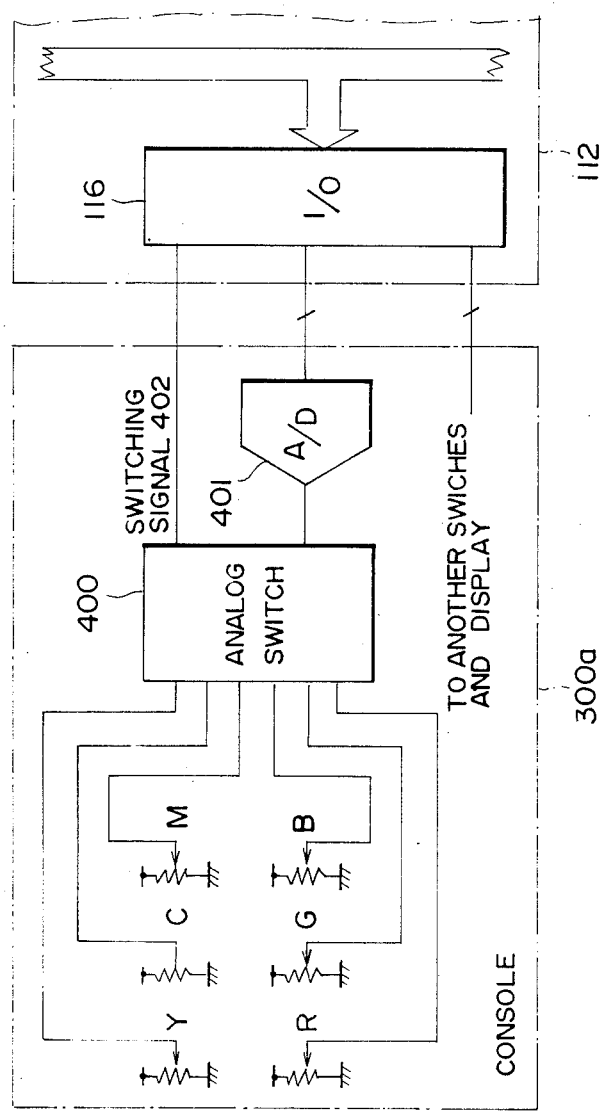
FIG. 13 is a block diagram showing an electrical constitution of the black color adjustment part shown in FIG. 10.

The output signal from the saturation adjustment knob in the black component adjustment part 300a on the console board 300 shown in FIG. 10 is inputted by way of an analog switch 400 to an A/D converter 401 as shown in FIG. 13. On the other hand, the system control unit 112 outputs an analog switching signal 402 by way of an I/0 port 116 to select the output signal of the knob, so that the knob setting value for A/D converted hue for each of the boundary planes can be read. Further, this embodiment shows a case where the black component extraction processing is conducted being divided into six hue regions adjacent to each other and independently on each of the hue areas.

Figure 14:
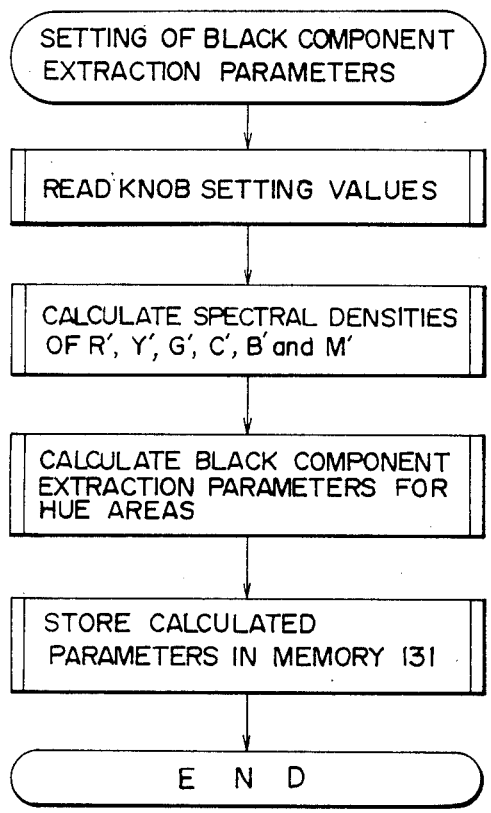
FIG. 14 is a flow chart for adjusting the ratio of the black toner component.

The system control unit 112 determines the black component extraction parameters KNr', KNg', KNb' in each of the hue areas in accordance with the flow chart shown in FIG. 14 and writes them into the coefficient memory 131.

Referring now to FIG. 14, analog switching signals 402 are at first outputted successively to read knob setting value Ar for the boundary hue R, knob setting value Ay for the boundary hue Y, knob setting value Ag for the boundary hue G, knob setting value Ac for the boundary hue C, and knob setting value Ab for the boundary hue B and knob setting value Am for the boundary hue M. Each of the knob setting values can vary from 0.1 to 1.

Then, chromatic colors R', Y', G', C', B' and M' on the respective hue boundary planes are determined in accordance with the respective knob setting values Ar, Ay, Ag, Ac, Ab, Am. Spectral densities (DRr, DRg, DRb), (DYr, DYg, DYb),(DGr, DGg, DGb), (DCr, DCg, DCb), (DBr, DBg, DBb), (DMr, DMg, DMb), and (DNr, DNg, DNb) for the maximum saturation colors R, Y, G, C, B and M on each of the hue boundary areas and the achromatic color N are recorded in the ROM 114. Thus the spectral densities (DRr', DRg', DRb'), (DYr', DYg', DYb'), (DGr', DGg', DGb'), (DCr', DCg', DCb'), (DBr', DBg', DBb') and (DMr', DMg', DMb') for the chromatic colors R', Y', G', C', B' and M' are calculated based on the spectral densities and the respective knob setting values Ar, Ay, Ag, Ac, Ab and Am in accordance with the following equation (21).

$$\begin{pmatrix} DRr' \\ DRg' \\ DRb' \end{pmatrix} = Ar \begin{pmatrix} DRr \\ DRg \\ DRb \end{pmatrix} + (1 - Ar) \begin{pmatrix} DNr \\ DNg \\ DNb \end{pmatrix}$$

$$\begin{pmatrix} DYr' \\ DYg' \\ DYb' \end{pmatrix} = Ay \begin{pmatrix} DYr \\ DYg \\ DYb \end{pmatrix} + (1 - Ay) \begin{pmatrix} DNr \\ DNg \\ DNb \end{pmatrix}$$

$$\begin{pmatrix} DGr' \\ DGg' \\ DGb' \end{pmatrix} = Ag \begin{pmatrix} DGr \\ DGg \\ DGb \end{pmatrix} + (1 - Ag) \begin{pmatrix} DNr \\ DNg \\ DNb \end{pmatrix}$$

$$\begin{pmatrix} DCr' \\ DCg' \\ DCb' \end{pmatrix} = Ac \begin{pmatrix} DCr \\ DCg \\ DCb \end{pmatrix} + (1 - Ac) \begin{pmatrix} DNr \\ DNg \\ DNb \end{pmatrix}$$

$$\begin{pmatrix} DBr' \\ DBg' \\ DBb' \end{pmatrix} = Ab \begin{pmatrix} DBr \\ DBg \\ DBb \end{pmatrix} + (1 - Ab) \begin{pmatrix} DNr \\ DNg \\ DNb \end{pmatrix}$$

$$\begin{pmatrix} DMr' \\ DMg' \\ DMb' \end{pmatrix} = Am \begin{pmatrix} DMr \\ DMg \\ DMb \end{pmatrix} + (1 - Am) \begin{pmatrix} DNr \\ DNg \\ DNb \end{pmatrix}$$

Then, black component extraction parameters, KNr', KNg' and KNb' for the respective hue areas are determined based on the spectral densities for the chromatic colors R', Y', G', C', B' and M' and the spectral density for the achromatic color N. That is, the black component extraction parameters KNr', KNg' and KNb' for the respective hue areas are calculated based on the spectral densities of the chromatic colors P, Q and the achromatic. color N on the boundary hue in the corresponding hue area in accordance with the equations (3) and (4). For example, the black component extraction parameters KNr', KNg', KNb' for the hue area surrounded with the boundary hues R and Y are calculated based on the spectral densities of the chromatic color R' and Y' and the spectral density of the achromatic color N in accordance with the equations (3) and (4).

Furthermore, the black component extraction parameters KNr', KNg' and KNb' for the respective hue areas obtained by calculation as described above are stored into the coefficient memory 131.

Accordingly, by manipulating the saturation adjustment knob in the black component adjustment part on the console board 300, the saturation for the chromatic colors R', Y', G', C', B' and M' can be adjusted independent of each other from the saturation of the highest saturation colors R, Y, G, C, B and M to the saturation of a color near the achromatic color N, respectively. Accordingly, since the changes as shown in FIGS. 2a, 2b, 3a, 3b, 3c and 4 can be obtained, the proportion between the synthesis C-M-Y color component and the black component in the toner for recording the achromatic component in the image can be adjusted.

That is, if the saturation of the boundary hues P and Q is reduced, the black component is reduced relative to a relatively high saturation color, while the synthesis C-M-Y color component is increased. For example, if the saturation of the boundary hues C and Q (that is R, Y) is reduced with respect to R and Y hue area including the skin color, the black component is reduced relative to the relatively high saturation color and the gradation reproducibility for the skin color is increased. On the contrary, if the saturation for the boundary hues P and Q is set highest, since all of the achromatic components in the image are recorded with the black toner, the hue error in the recorded image can be decreased.

Figure 15:
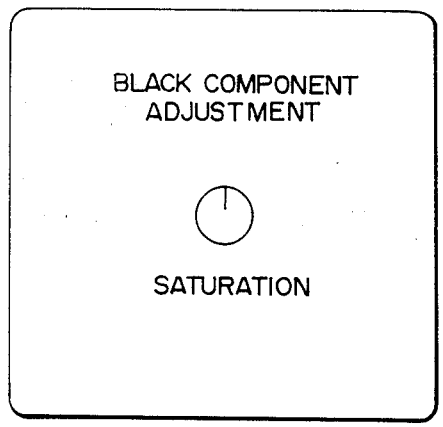
FIG. 15 is a front view for another embodiment of the black color adjustment part.

FIG. 15 shows another embodiment for a black component adjustment part situated at a portion of the console board 300 in the device shown in FIG. 6, in which a single knob for saturation adjustment is provided. The knob is also connected to the sliding shaft of a single variable resistor not illustrated and the system control unit can read the knob setting value A by way of the A/D converter.

The system control unit of this embodiment performs the same calculation processing as described above while regarding the knob setting value A as the setting value in common with each of the hue areas (Ar=Ay=Ag=Ac=Ab=Am=A).

By manipulating the knob for the saturation adjustment part in the black component adjustment part on the console board, the saturation for the chromatic colors R', Y', G', C', B' and M' can be adjusted independent of each other from the saturation of the highest saturation colors R, Y, G, C, B and M to the saturation of a color near the achromatic color N, respectively. Accordingly, since the changes as shown in FIGS. 2a, 2b, 3a, 3b, 3c and 4 can be obtained, the proportion between the synthesis C-M-Y color component and the black component of the toner for recording the achromatic color component in the image can be adjusted.

Figure 16:
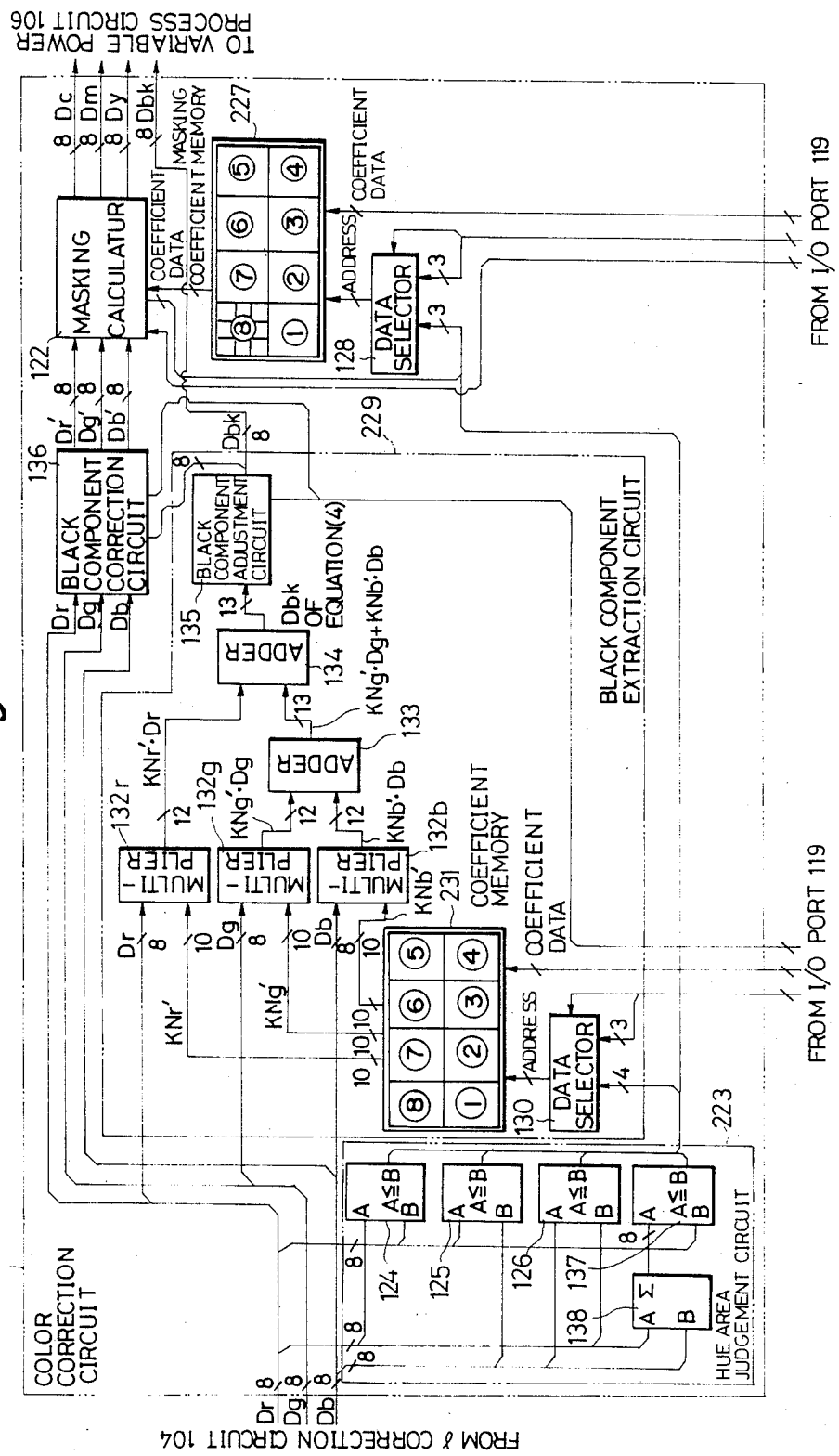
FIG. 16 is a block diagram of another embodiment of the color correction circuit of FIG. 6.

FIG. 16 shows another embodiment of the color correction circuit. In this embodiment, eight hue areas are disposed. In the embodiment of FIG. 16, the constitutions for the hue area judgement circuit 223, a black component extraction circuit 224 and a masking coefficient memory 227 are somewhat different from those of the embodiment shown in FIG. 12.

Figure 17:
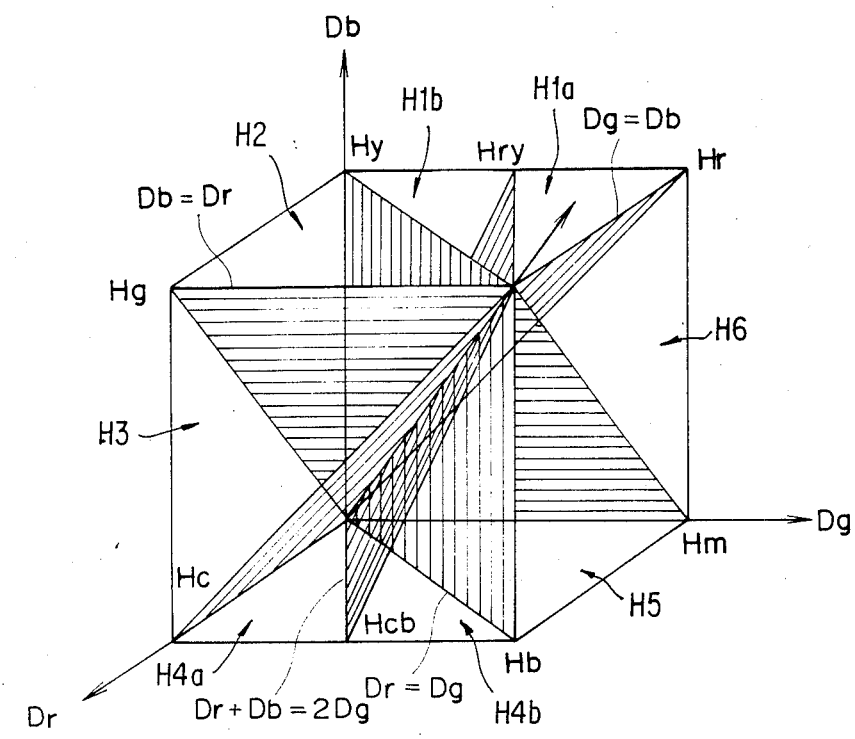
FIG. 17 is a graph showing the color space represented by three axes of Dr, Dg and Db for explaining the embodiment of FIG. 16.

That is, as shown in FIG. 17 in this embodiment, new boundaries Hry and Hcb for the hue areas are disposed about at the intermediate of the hues Hr and Hy, and the hues Hc and Hb, respectively, and processing is performed while discriminating into the hue areas eight in total. In this case, hues having the spectral densities Dr, Dg and Db with the relationship represented by the following equations are selected for the boundary planes Hry and Hcb.

*Boundary Hry:* $Dr + Db = 2Dg$ *and* $Dr < Db$         5

*Boundary HCb:* $Dr + Db = 2Dg$ *and* $Db < Dr$

Accordingly, if the color to be recorded/reproduced is situated in the hue region la put between the boundary area 1a of the hue Hr and the hue Hry, the condition shown by the equation (22) are established.

If in the hue area H1a (between hue Hr–hue Hry):

$$Dr \leq Dg < Db \text{ and } Dr + Db \geq 2Dg \quad (22)$$

If in the hue area H1b (between hue Hry–hue Hy):

$$Dr \leq Dg \leq Db \text{ and } Dr + Db \leq 2Dg \quad (23)$$

If in the hue area H4a (between hue Hc–hue Hcb):

$$Db \leq Dg \leq Dr \text{ and } Dr + Db \geq 2Dg \quad (24)$$

If in the hue area H4b (between hue Hcb–hue Hb):

$$Db \leq Dg \leq Dr \text{ and } Dr + Db \geq 2Dg \quad (25)$$

Further in the hue area H2 (between hue Hy–hue Hg), hue area H3 (between hue Hg–hue Hc), hue area H5 (between hue Hb–hue Hm) and hue area H6 (between hue Hm–hue Hr), the conditions shown by the equations (11), (12), (14) and (15) are established. Accordingly, the area judgement is possible by additionally providing adders and comparators.

In FIG. 16, the hue area judgement circuit 223 comprises four comparators 124 to 126, and 137 and adder 38. The result of addition for Dr and Db outputted from the adder 138 and the doubled value for Dg are inputted to the comparator 137. Accordingly, the comparators 124 to 26, and 137 produce outputs shown in Table 4.

TABLE 4

| Comparator | Input | Output | | | | | | | | |
|---|---|---|---|---|---|---|---|---|---|---|
| 124 | Dr, Dg | H | H | L | L | L | L | H | H | H |
| 125 | Dg, Db | H | H | H | H | L | L | L | L | H |
| 126 | Db, Dr | L | L | L | H | H | H | H | L | H |
| 137 | Dr + Db, 2Dg | H | L | L | L | L | H | H | H | H |
| Area judgement | (memory read area) | H1a | H1b | H2 | H3 | H4a | H4b | H5 | H6 | |

The area judgement output is applied by way of the data selector 130 as the data (black component extraction parameters) group address data to the coefficient memory 231, as well as by way of the the data selector 128 to the masking memory 227 as the data (color correction parameters) group address data.

As has been described above, by using the adders and the comparators, the hue area judqement circuit 223 can be realized with a relatively simple constitution also in a case of using other boundaries than those shown by the equation (5) above.

Many widely different embodiments of the present invention may be constructed without departing from the spirit and scope of the present invention. It should be understood that the present invention is not limited to the specific embodiments described in this specification, except as defined in the appended claims.

What is claimed is:

1. A method of extracting a black color component from input image signals of basic colors, representative of color separated input images, said method comprising the steps of:

judging to which hue area among at least three predetermined hue areas the hue represented by said input image signals belongs;

setting black color extraction parameters with respect to the judged hue area, the black color extraction parameters being determined from two chromatic colors P and Q positioned in respective boundary planes which define said judged hue area and from an achromatic color N; and extracting the black color component contained in said input images in accordance with said set black color extraction parameters to produce a black color component signal representative of the extracted black color component.

2. A method as claimed in claim 1, wherein said judging step includes the step of comparing the input image signals with each other.

3. A method as claimed in claim 1, wherein said setting step includes the step of storing black color extraction parameters, and the step of selecting a part of the stored black color extraction parameters in accordance with the hue area judged.

4. A method of extracting a black color component from input image signals of basic colors, representative of color-separated input images, said method comprising the steps of:

designating a desired saturation;

judging to which hue area among at least three predetermined hue areas the hue represented by said input images signals belongs;

setting black color extraction parameters with respect to the judged hue area, the black color extraction parameters being determined from two chromatic colors P and Q positioned in respective boundary planes which define said judged hue area and from an achromatic color N, the ratio between a color component synthesized from the chromatic colors P and Q and the black color component being controlled depending upon said designated saturation; and extracting the black color component contained in said input images in accordance with said set black color extraction parameters to produce a black color component signal representative of the extracted black color component.

5. A method as claimed in claim 4, wherein said judging step includes the step of comparing the input image signals with each other.

6. An apparatus for extracting a black color component from input image signals of basic colors, representative of color-separated input images, said apparatus comprising:

means for judging to which hue area among at least three predetermined hue areas the hue represented by said input image signals belongs;

means for setting black color extraction parameters with respect to the judged hue area, the black color extraction parameters being determined from two chromatic colors P and Q positioned in respective boundary planes which define said judged hue area and from an achromatic color N; and means for extracting the black color component contained in said input images in accordance with said set black color extraction parameters to produce a black color component signal representative of the extracted black color component.

7. An apparatus as claimed in claim 6, wherein said judging means includes means for comparing the input image signals with each other.

8. An apparatus as claimed in claim 7, wherein said comparing means includes three comparators for comparing the three input image signals with each other.

9. An apparatus for extracting a black color component from input image signals of basic colors, representative of color-separated input images, said apparatus comprising:

means for designating a desired saturation;

means for judging to which hue area among at least three predetermined hue areas the hue represented by said input image signals belongs;

means for setting black color extraction parameters with respect to the judged hue area, the black color extraction parameters being determined from two chromatic colors P and Q positioned in respective boundary planes which define said judged hue area and from an achromatic color N, the ratio between a color component synthesized from the chromatic colors P and Q and the black color component being controlled depending upon the designated saturation from said designating means; and means for extracting the black color component contained in said input images in accordance with said set black color extraction parameters to produce a black color component signal representative of the extracted black color component.

10. An apparatus as claimed in claim 9, wherein said judging means includes means for comparing the input image signals with each other.

11. An apparatus as claimed in claim 10, wherein said comparing means includes three comparators for comparing the three input image signals with each other.

12. An apparatus as claimed in claim 9, wherein said setting means includes means for storing black color extraction parameters, and means for selecting a part of the black color extraction parameters storing in said storing means in accordance with the hue area judged.

13. A color image reproducing machine comprising:

means for optoelectrically converting light signals separated in basic colors, representative of color-separated images of an original document, to electrical input image signals, respectively;

means for judging to which hue area among at least three predetermined hue areas the hue represented by said input image signals belongs;

means for setting black color extraction parameters with respect to the judged hue area, the black color extraction parameters being determined from two chromatic colors P and Q positioned in respective boundary planes which define said judged hue area and from an achromatic color N;

means for extracting the black color component contained in said input images in accordance with said set black color extraction parameters to produce a black color component signal representative of the extracted black color component;

means for correcting the input image signals in accordance with said black color component signal;

means for converting said corrected input image signals to output image signals; and means for printing a color image of the original in accordance with said converted output image signals.

14. A machine as claimed in claim 13, wherein said judging means includes means for comparing the input image signals with each other.

15. A machine as claimed in claim 14, wherein said comparing means includes three comparators for comparing the three input image signals with each other.

16. A method of extracting a black color component from three input image signals of basic colors, representative of color-separated input images, said method comprising the steps of:

judging to which hue area among at least three predetermined hue areas the hue represented by said input image signals belongs, including, adding two of the three input image signals, and comparing the remaining one of the three input image signals with the added result;

setting black color extraction parameters with respect to the judged hue area, the black color extraction parameters being determined from two chromatic colors P and Q positioned in respective boundary planes which define said judged hue area and from an achromatic color N; and extracting the black color component contained in said input images in accordance with said set black color extraction parameters to provide a black color component signal representative of the extracted black color component.

17. A method of extracting a black color component from three input image signals of basic colors, representative of color-separated input images, said method comprising the steps of:

designating a desired saturation;

judging to which hue area amount at least three predetermined hue areas the hue represented by said input image signals belongs including, adding two of the three input image signals, and comparing the remaining one of the three input image signals with the added result;

setting black color extraction parameters with respect to the judged hue area, the black color extraction parameters being determined from two chromatic colors P and positioned in respective boundary planes which define said judged hue area and from an achromatic color N, the ratio between the color component synthesized from the chromatic colors and the black color component being controlled depending upon said designated saturation; and extracting the black color component contained in said input images in accordance with said set black color extraction parameters to produce a black color component signal representative of the extracted black color component.

18. A method as claimed in claim 17, wherein said setting step includes the step of storing black color extraction parameters and the step of selecting a part of the stored black color extraction parameters in accordance with the hue area judged.

19. An apparatus for extracting a black color component from three input image signals of basic colors, representative of color-separated input images, said apparatus comprising:

means for judging to which hue area among at least three predetermined hue areas the hue represented by said input image signals belongs, including means for adding two of the three input image signals, and means for comparing the remaining one of the three input image signals with the added result;

means for setting black color extraction parameters with respect to the judged hue area, the black color extraction parameters being determined from two chromatic colors P and Q positioned in respective boundary planes which define said judged hue area and from an achromatic color N; and means for extracting the black color component contained in said input images in accordance with said set black color extraction parameters to produce a black color component signal representative of the extracted black color component.

20. An apparatus as claimed in claim 19, wherein said adding means includes an adder for adding two of the three input image signals to produce an output signal, and wherein said comparing means includes a comparator for comparing the remaining one of the three input image signals with the output signal from the adder.

21. An apparatus as claimed in claim 19, wherein said setting means includes means for holding black color extraction parameters, and means for selecting a part of the black color extraction parameters held in said storing means in accordance with the hue area judged.

22. An apparatus as claimed in claim 19, wherein said extracting means includes a plurality of multipliers, with each multiplier receiving one of said input image signals and each multiplier also receiving a black color extraction parameter from said setting means, for producing a product signal, and at least one adder for adding together said product signals to product an output signal.

23. An apparatus for extracting a black color component from three input image signals of basic colors, representative of color-separated input images, said apparatus comprising:

means for designating a desired saturation;

means for judging to which hue area among at least three predetermined hue areas the hue represented by said input image signals belongs, including means for adding two of the three input image signals, and means for comparing the remaining one of the three input image signals with the added result;

means for setting black color extraction parameters with respect to the judged hue area, the black color extraction parameters being determined from two chromatic colors P and Q positioned in respective boundary planes which define said hudged hue area and from an achromatic color N, the ratio between the color component synthesized from the chromatic colors and the black color component being controlled depending upon the designated saturation from said designating means; and means for extracting the black color component contained in said input images in accordance with said set black color extraction parameters to produce a black color component signal representative of the extracted black color component.

24. An apparatus as claimed in claim 23, wherein said adding means includes an adder for adding two of the three input signals to produce an output signal, and wherein said comparing means includes a comparator for comparing the remaining one of the three input image signals with the output signal from the adder.

25. A color image reproducing machine comprising:

means for optoelectrically converting light signals separated in basic colors, representative of color-separated images of an original document, to three electrical input image signals, respectively;

means for judging to which hue area among at least three predetermined hue areas the hue represented by said input image signals belongs, including;

means for adding two of the three input image signals, and means for comparing the remaining one of the three input image signals with the added result;

means for setting black color extraction parameters with respect to the judged hue area, the black color extraction parameters being determined from two chromatic colors P and Q positioned in respective boundary planes which define said judged hue area and from an achromatic color N;

means for extracting the black color component contained in said input images in accordance with said set black color extraction parameters to produce a black color component signal representative of the extracted black color component;

means for correcting the input image signals in accordance with said black color component signal;

means for converting said corrected input image signals to output image signals; and means for printing a color image of the original in accordance with said converted output image signals.

26. A machine as claimed in claim 25, wherein said adding means includes an adder for adding two of the three input image signals to produce an output signal, and wherein said comparing means includes a comparator for comparing the remaining one of the three input image signals with the output signal from the adder.

27. A machine as claimed in claim 25, wherein said setting means includes means for storing black color extraction parameters, and means for selecting a part of the black color extraction parameters stored in said storing means in accordance with the hue area judged.

28. A machine as claimed in claim 25, wherein said extracting means includes a plurality of multipliers, with each multiplier receiving one of said input image signals and each multiplier also receiving a black color extraction parameter from said setting means, for producing a product signal, and at least one adder for adding together said product signals to produce an output signal.

29. A machine as claimed in claim 25, wherein said comparing means includes three comparators for comparing the three input image signals with each other.

* * * * *